(12) United States Patent
Hamada et al.

(10) Patent No.: US 7,402,772 B2
(45) Date of Patent: Jul. 22, 2008

(54) LASER PROCESSING METHOD AND PROCESSING DEVICE

(75) Inventors: Shiro Hamada, Yokosuka (JP); Jiro Yamamoto, Yokosuka (JP); Tomoyuki Yamaguchi, Yokosuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/598,708

(22) Filed: Nov. 14, 2006

(65) Prior Publication Data

US 2007/0062919 A1 Mar. 22, 2007

Related U.S. Application Data

(60) Division of application No. 11/065,589, filed on Feb. 25, 2005, which is a continuation of application No. PCT/JP03/11126, filed on Aug. 29, 2003.

(30) Foreign Application Priority Data

Aug. 30, 2002 (JP) ............................. 2002-254015

(51) Int. Cl.
*B23K 26/38* (2006.01)
*B23K 26/067* (2006.01)

(52) U.S. Cl. ..................... 219/121.71; 219/121.7; 219/121.76

(58) Field of Classification Search ............ 219/121.7, 219/121.71, 121.76, 121.61, 121.77
See application file for complete search history.

(56) References Cited

U.S. PATENT DOCUMENTS

| | | | | |
|---|---|---|---|---|
| 4,566,765 A | * | 1/1986 | Miyauchi et al. | ............ 359/618 |
| 5,194,713 A | * | 3/1993 | Egitto et al. | ............ 219/121.71 |
| 5,393,957 A | * | 2/1995 | Misawa et al. | ......... 219/121.76 |
| 5,651,904 A | * | 7/1997 | Franke et al. | .......... 219/121.67 |
| 5,933,218 A | | 8/1999 | Matsubara et al. | |

(Continued)

FOREIGN PATENT DOCUMENTS

DE 19744368 A1 * 5/1999

(Continued)

OTHER PUBLICATIONS

Japanese Office Action dated Dec. 26, 2006 corresponding to application No. 2004-532781.

(Continued)

*Primary Examiner*—Geoffrey S Evans
(74) *Attorney, Agent, or Firm*—Squire, Sanders & Dempsey L.L.P.

(57) ABSTRACT

Embodiments of the invention provide a laser processing apparatus and method. The laser processing apparatus includes a holder that holds a processing target, a first laser source that emits pulsed laser beam, and a second laser source that emits continuous-wave laser beam. The apparatus further includes an optical system that transmits the pulsed laser beam from the first laser source and the continuous-wave laser beam from the second laser source on a surface of the processing target held by the holder in such a manner that a beam spot of the pulsed laser beam is included inside a beam spot of the continuous-wave laser beam, and a moving mechanism that moves the beam spots of the pulsed laser beam and the continuous-wave laser beam on the surface of the processing target.

6 Claims, 29 Drawing Sheets

U.S. PATENT DOCUMENTS

2002/0023903 A1 * 2/2002 Ann Ngoi et al. ...... 219/121.68
2002/0125221 A1 * 9/2002 Kresge ................... 219/121.7

FOREIGN PATENT DOCUMENTS

| | | | |
|---|---|---|---|
| EP | 544398 A1 * | 6/1993 | |
| JP | 62-231921 | 10/1987 | |
| JP | 6142961 A * | 5/1994 | |
| JP | 09-192868 | 7/1997 | |
| JP | 09-293946 | 11/1997 | |
| JP | 10-137966 | 5/1998 | |
| JP | 10-286683 | 10/1998 | |
| JP | 10-323788 | 12/1998 | |
| JP | 2000-271770 | 10/2000 | |
| JP | 2001-212685 | 8/2001 | |
| JP | 2001-212685 A * | 8/2001 | |
| JP | 2001-219285 | 8/2001 | |
| JP | 2001-345536 | 12/2001 | |
| JP | 2002-120080 | 4/2002 | |
| JP | 2002-224865 | 8/2002 | |
| JP | 2003-204137 A * | 7/2003 | |

OTHER PUBLICATIONS

Japanese Office Action dated Mar. 18, 2008 with translation.

* cited by examiner

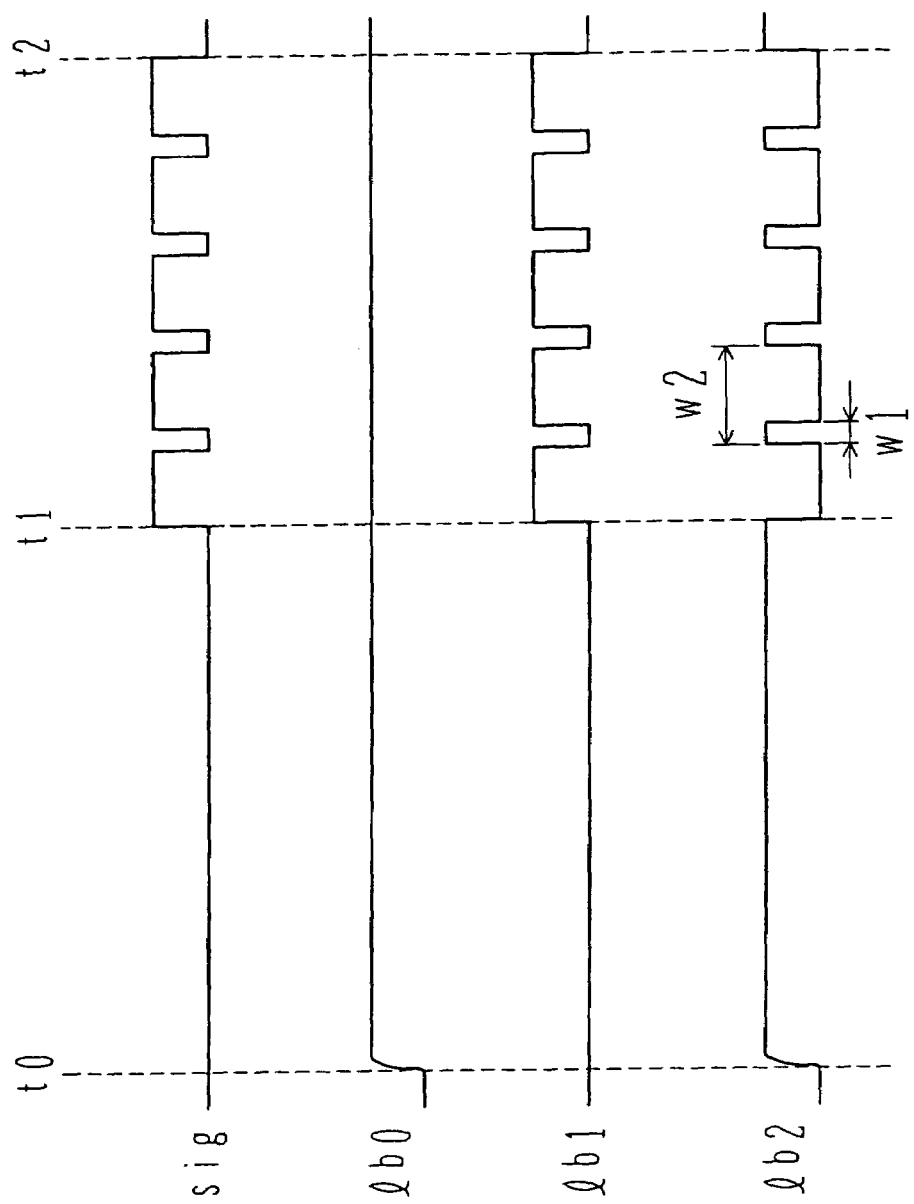

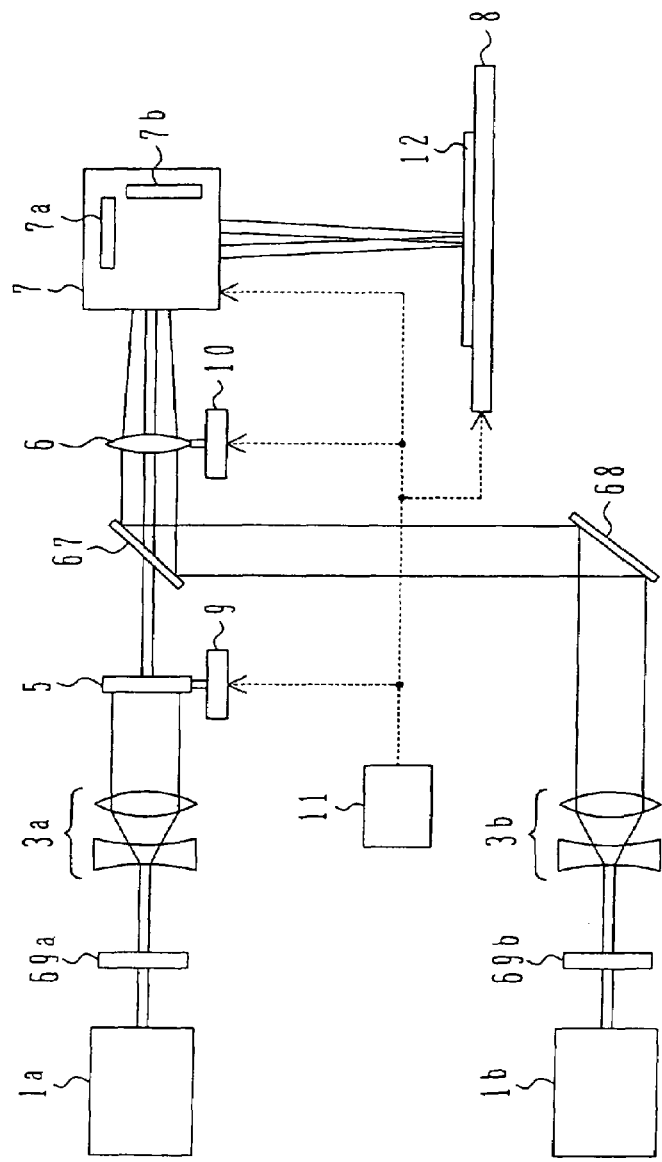
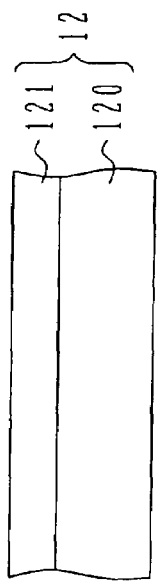
FIG. 27A
FIG. 27B

# LASER PROCESSING METHOD AND PROCESSING DEVICE

CROSS REFERENCE TO RELATED APPLICATIONS

This application is a divisional application of U.S. patent application Ser. No. 11/065,589, filed Feb. 25, 2005, which is a continuation application of PCT/JP03/011126, filed on Aug. 29, 2003, which claims priority on Japanese patent application 2002-254015, filed on Aug. 30, 2002, which are incorporated herein by reference.

BACKGROUND OF THE INVENTION

A) Field of the Invention

This invention relates to a laser processing method and a laser processing apparatus processes by irradiating laser beam on a processing target.

B) Description of the Related Art

FIG. 9 is a schematic view showing a conventional laser processing apparatus that forms a groove. Pulsed laser beam is radiated from a light source 51, for example, at frequency of 1 kHz. After pulse energy density of a beam cross section is uniformed (flat-topped) by a homogenizer 52, the cross section of the laser beam is formed to be a circular-shape. The laser beam of which the cross section has been formed is reflected by a reflection mirror 54 and irradiates to a substrate 56 via a focus lens 55. The substrate 56 is, for example, a substrate wherein an indium-tin-oxide (ITO) film is formed on a glass basic material. The laser beam irradiates to the ITO film on the substrate 56. A beam spot of the laser beam irradiated onto a surface of the ITO film is, for example, a circle with diameter of 0.2 mm. The substrate 56 is loaded on an XY stage 57. By moving the substrate 56 in a two dimensional plane, an irradiation position of the pulsed laser beam can be moved in the surface of the substrate 56.

First, tin order o form groove on the ITO film on the substrate 56, the XY stage 57 is moved so that the pulsed laser beam is irradiated with a 50% redundancy rate. The redundancy rate means that a rate of a moving distance to a direction of a radius of a circle by one shot of the pulsed laser beam to the diameter.

FIG. 10A is a schematic plan view of the substrate 56 wherein a groove is formed on the ITO film by opening continuous holes by the laser beam irradiated with 50% redundancy rate. The openings of the groove are indicated with thick lines. As a result that the holes with a shape depending on the beam spot of the laser beam irradiated onto the ITO film are continuously excavated, the groove is formed. Therefore, edges of the openings along the direction of the groove length have bumps by a part of a perimeter of the circular beam spot. Also, when the frequency of the laser beam to be irradiated is 1 kHz, and the beam spot of the laser beam on the ITO film on the substrate 56 is a circle of diameter of 0.2 mm, processing velocity becomes 100 m/s. Mainly, the processing velocity is controlled by the moving velocity of the XY stage; therefore, the processing velocity cannot be increased more than 100 mm/s considering uniformity of the processed form.

In order to make the edges of the openings of the groove formed on the ITO film close to a straight line, a method for increasing the redundancy rate will be used. For example, the XY stage 57 is moved so that the pulsed laser beam is irradiated with 90% redundancy rate onto the ITO film of the substrate 56 to form the groove.

FIG. 10B is a schematic plan view of the substrate 56 on which the groove is formed on the ITO film by opening continuous holes with the laser beam irradiated with 90% redundancy rate. Similar to FIG. 10A, the openings of the groove are indicated with the thick lines. The edges of the openings along the length direction of the grooves become closer to a straight line. However, the processing velocity is 1/5 of the case that the 50% redundancy rate is used, that is, 20 mm/s because the laser beam is irradiated with 90% redundancy rate. Although the forms of the opening can be improved, time efficiency of the process becomes worse.

FIG. 11 is a schematic cross sectional view of the substrate 56. The groove is formed on the ITO film formed on the glass basic material. The sidewalls of the groove are inclined to the surface of the substrate 56. It is preferable that the groove has a sheer sidewall shape.

SUMMARY OF THE INVENTION

It is an object of the present invention to provide a laser processing method and a laser processing apparatus that can execute a high quality laser process.

According to one aspect of the present invention, there is provided a laser processing method, comprising the steps of: (a) irradiating laser beam from a laser source through an optical system onto a surface of a processing target; and (b) scanning said laser beam on the surface of the processing target by the optical system and so controlling at least one parameter among those of said laser source and said optical system that variation of an irradiating condition of the laser beam on the processing target caused by the scanning is suppressed.

According to another aspect of the present invention, there is provided a laser processing apparatus, comprising: a laser source that emits laser beam; a holder that holds a processing target; an optical system comprising a lens that condenses the laser beam from the laser source, and a beam scanner that sweeps the laser beam passed through the lens, to scan an incident point of the laser beam on a surface of the processing target held by the holder; and a controller which so controls at least one parameter among those of said laser source and said optical system that variation of an irradiating condition of the laser beam on the processing target caused by scanning is suppressed.

BRIEF DESCRIPTION OF THE DRAWINGS

FIG. 23 is an example of a timing chart of a trigger signal and the laser beam when the laser processing is executed by using the laser processing apparatus according to the sixth embodiment of the present invention.

FIG. 27A is a schematic view of the laser processing apparatus according to the seventh embodiment of the present invention, and FIG. 27B is a schematic cross sectional view of the substrate.

DETAILED DESCRIPTION OF THE PREFERRED EMBODIMENTS

Figure 1:
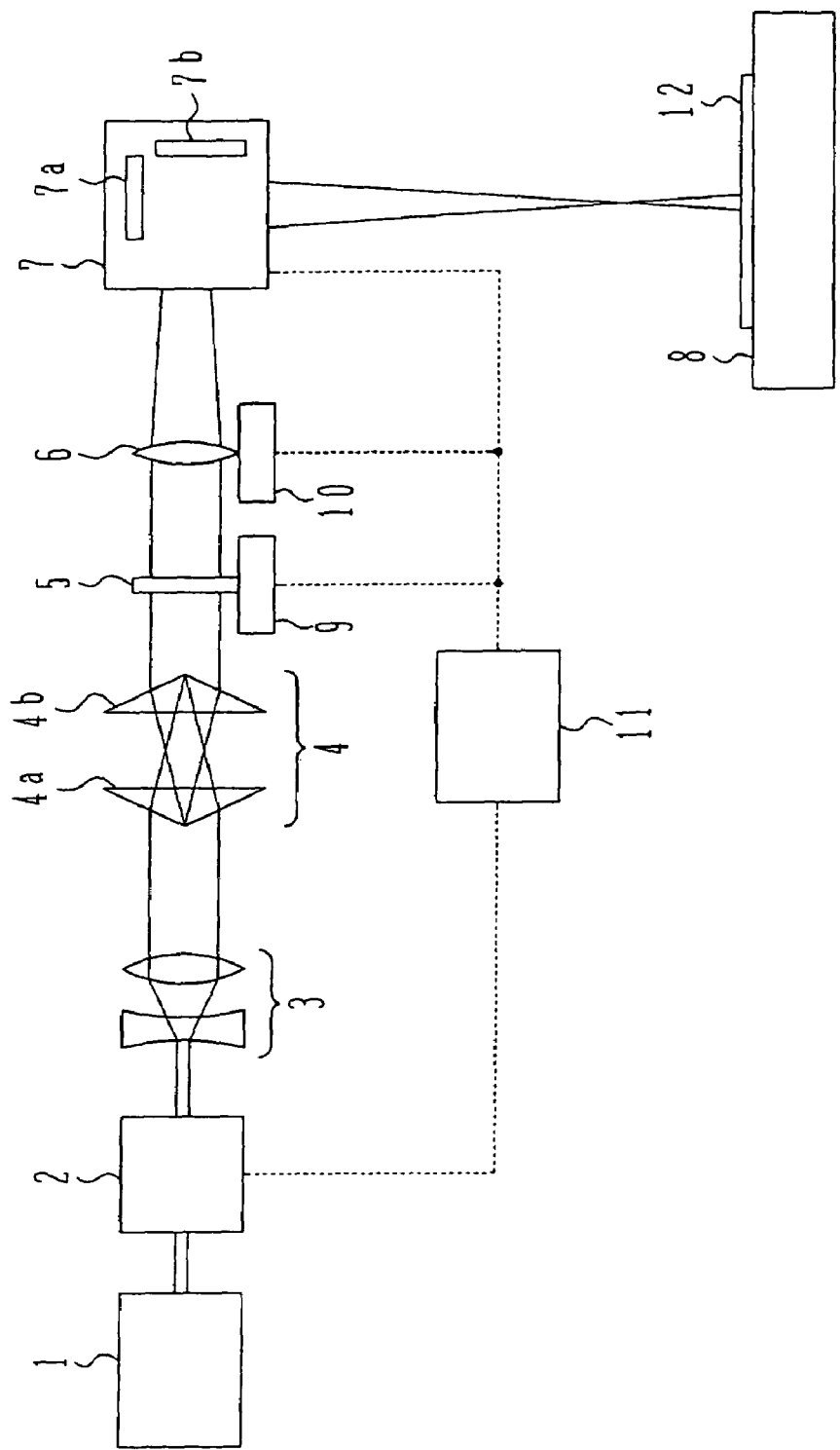
FIG. 1 is a schematic view of a laser processing apparatus according to the first embodiment of the present invention.

FIG. 1 is a schematic view of a laser processing apparatus according to the first embodiment of the present invention.

A high frequency (a wave length of 355 nm) that is three times of Nd:YAG laser is radiated (or emitted) with a pulse energy 1 mJ/pulse and a pulse width 50 ns from a laser source 1, for example, Nd:yttrium-alminum-garnet (YAG) laser oscillator including a wave-length conversion unit. The laser beam passes through a variable attenuator 2 that adjusts the pulse energy, and then through an expander 3 that enlarges diameter and emits an expanded collimated beam, and is incident on a cone optical system 4. The cone optical system 4 is formed of one pair of cone lenses 4a and 4b. The pair of the cone lenses 4a and 4b are, for example, in the same shape and are positioned so that the bottoms counter to each other. The laser beam is irradiates from the direction of a right cone axis to the cone lens 4a so that the center of the beam cross section overlaps the top of the right cone part and radiated from the cone lens 4b. The cone optical system 4 converts beam profile of the laser beam to irradiate in order to be weak in the central part of the beam cross section and to be powerful in the peripheral part. This will be explained later. Moreover, as for the cone optical system 4, a convex lens instead of the cone lens 4b at the laser beam radiation side can be used.

The laser beam radiated from (or passed through) the cone optical system 4 passes an object lens 6 that focuses the rectangular pierced hole of the mask 5 on the substrate 12. The mask 5 and the object lens 6 can move to a parallel direction to the moving direction of the laser beam by the each of voice coil mechanisms 9 and 10 (it can be replaced by a driver mechanism such as a piezo-driver mechanism). The voice coil mechanisms 9 and 10 are driven by a signal transmitted from a controller 11. Moreover, the substrate 12 is fixed on a holding stand (or holder) 8.

The laser beam concentrated (or condensed) by the object lens 6 irradiated to a galvano scanner 7. The galvano scanner 7 is formed of a scanner for X 7a and a scanner for Y 7b, and scans the laser beam at high velocity in a two dimensional direction. The scanner for X 7a and the scanner for Y 7b are formed of a reflection mirror that is oscillatable. When an X direction and a Y direction which cross each other are decided on the substrate 12 to be held on the holding stand 8, the scanner for X 7a and the scanner for Y 7b scan the laser beam so that each of the irradiation positions of the laser beam concentrated by the object lens 6 moves toward the X direction and the Y direction on the surface of the substrate 12. The galvano scanner 7 can scan the laser beam in a two dimensional direction by combining the scanner for X 7a and the scanner for Y 7b.

The substrate 12 that is a processing target is, for example, a substrate wherein the indium-tin-oxide (ITO) film is formed on a glass base material, and the laser beam irradiates to the ITO film of the substrate 12 at a processing energy of about 1 J/cm$^2$.

Figure 2:
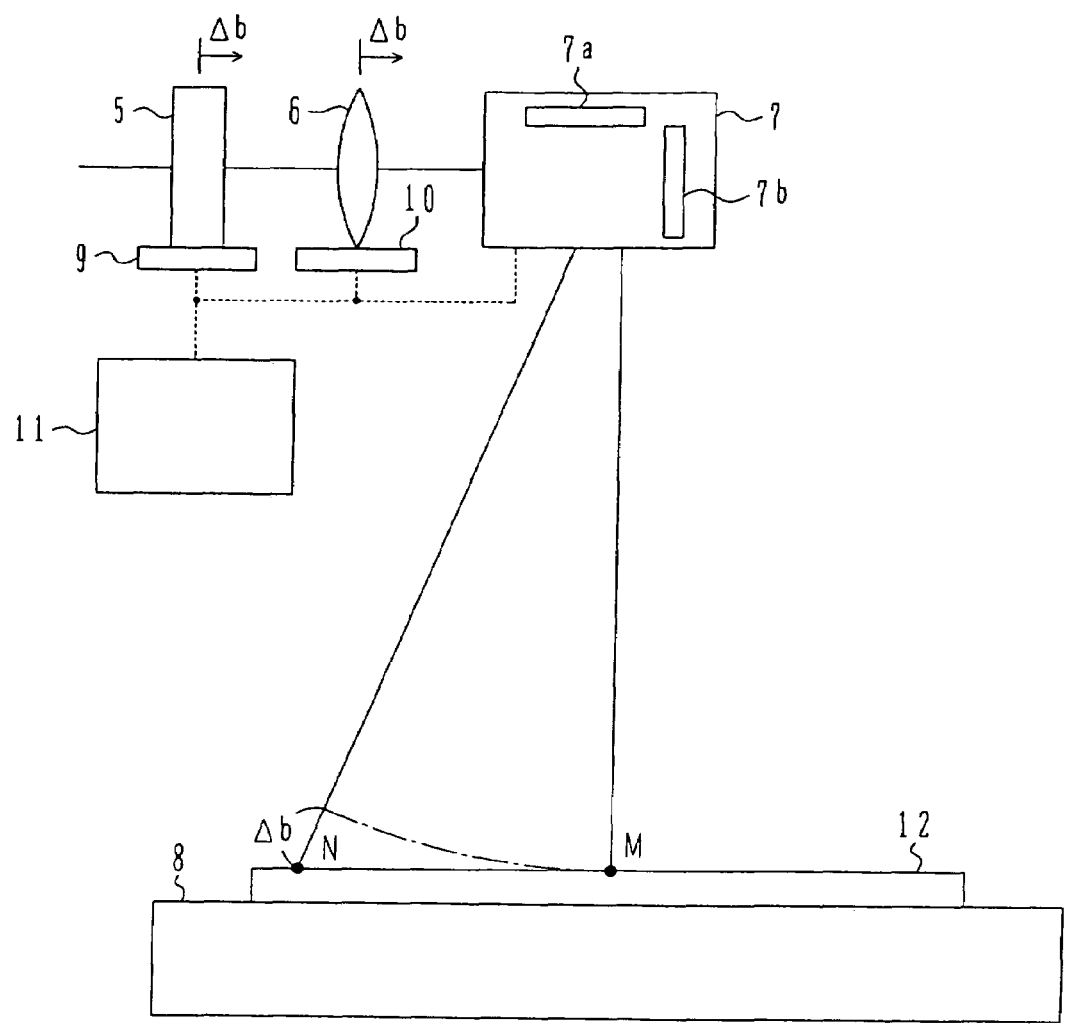
FIG. 2 is a schematic view showing a light path of laser beam in the laser processing apparatus according to the first embodiment of the present invention.

FIG. 2 is a schematic view showing a light path of laser beam that scans on the substrate 12 via the mask 5, the object lens 6 and the galvano scanner 7.

When the laser beam is irradiating to an irradiating position (which is the position of the laser beam spot on the target to be processed) M on the substrate 12, a pierced hole of the mask 5 is focused at M. Also, when an optical length from the mask 5 to the object lens 6 is a, and when an optical length from the object lens 6 to the irradiating position (or incident position) on the substrate 12 is b, and when a focal length of the object lens 6 is f, it is necessary to satisfy the following equation in order to focus the pierced hole of the mask on the substrate 12.

$$(1/a)+(1/b)=1/f \qquad (1)$$

By the operation of the galvano scanner 7, the irradiating position of the laser beam is changed from the irradiation position M on the substrate 12 to N. If incident angles to the irradiating position M and an incident angle to the irradiating position N are different, and if the mask 5 and the object lens 6 are fixed, the optical length from the object lens 6 to the irradiating position M and the optical length from the object lens 6 to the irradiating position N are different. (the difference is expressed as Δb). Therefore, the pierced hole of the mask 5 is not focused on the N.

In the laser processing apparatus shown in FIG. 1, the controller 11 is synchronized with the movement of the galvano scanner 7 and a signal to move the mask 5 and the object lens 6 to each of the voice coil mechanisms 9 and 10. This signal is a signal for moving the mask 5 and the object lens 6 in order to maintain a fixed optical length from the mask 5 to the object lens 6 and from the object lens 6 to the irradiating position on the substrate 12. The voice coil mechanisms 9 and 10 receive the signal from the controller 11 and move each of the mask 5 and the object lens 6 toward a parallel direction to the moving direction of the laser beam.

As shown in FIG. 2, when the irradiating position M is changed to N, a moving distance of the mask 5 and the object lens 6 by the voice coil mechanisms 9 and 10 is Δb. The mask 5 and the object lens 6 are displaced by the same length Δb to the same direction. By doing this, the above equation (1) is satisfied, and the pierced hole of the mask 5 is focused at the irradiating position N.

Not only in the two points of the irradiating positions M and N, for example, when the optical length a from the mask 5 to the object lens 6 and the optical length b from the object lens 6 to the irradiating position on the substrate 12 are always fixed during scanning the laser beam, the pierced hole of the mask 5 is focused on the surface of the substrate 12. The mask 5 and the object lens 6 are synchronized with the scanning of the laser beam by the galvano scanner 7, and are moved so that the optical length a and the optical length b are always fixed. In this case, focus magnification (a reduction rate) of the pieced hole of the mask 5 is always fixed.

For example, when the focal length f of the object lens 6 is 833 mm, and when the optical length a from the mask 5 to the object lens 6 is 5000 mm, and when the optical length b from the object lens 6 to the irradiating position on the substrate 12 is fixed 1000 mm, focus magnification (a reduction rate) of the pierced hole of the mask 5 is ⅕.

Figure 3A:
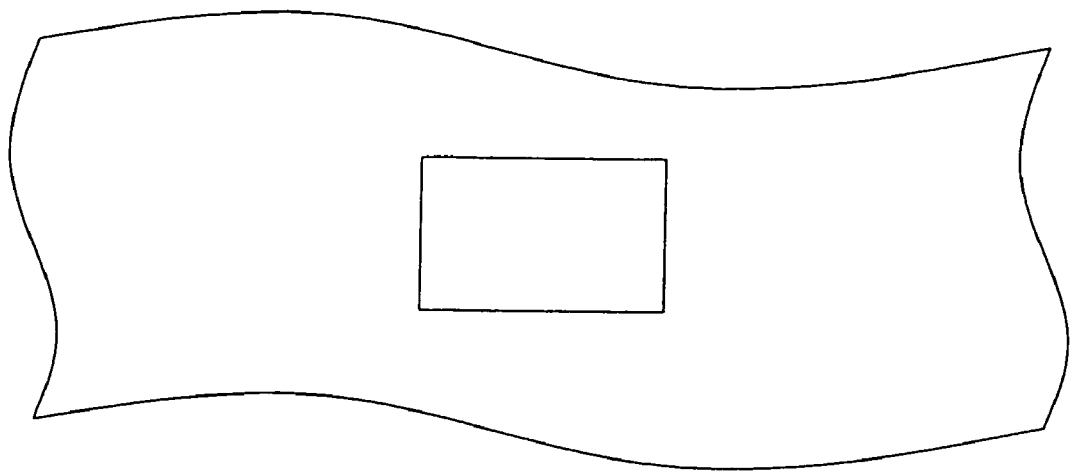
FIG. 3A and FIG. 3B are schematic plan views of a substrate processed by the laser beam irradiation.

FIG. 3A is a schematic plan view of a substrate 12 wherein a hole is formed at a focus position by irradiating one shot of the laser beam in order to focus a rectangular pierced hole of the mask 5 on the surface of the substrate 12. On the substrate 12, a rectangular beam spot which the pierced hole is focused is formed, and a hole is opened at the position on the ITO film.

Figure 3B:
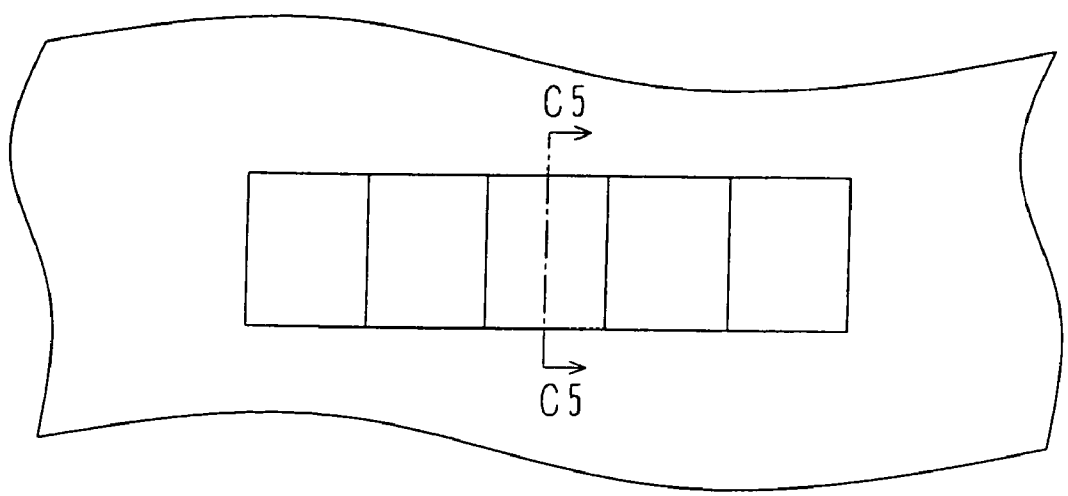

FIG. 3B is a plan view of the substrate 12 on which a groove is formed at the irradiating position. In FIG. 3B, the irradiation position of the beam is moved focusing the rectangular pierced hole of the mask 5 at a fixed focus magnification (a reduction rate), and the groove is formed at the irradiating position by irradiating the four-shots pulsed laser beam. The pulsed laser beam is scanned toward a long side direction of the beam spot focus in a rectangle by the galvano scanner 7. Also, the beam is irradiated at the 50% redundancy rate, and the opened holes are continued at each shot to form the groove.

A fixed sized rectangular beam spot is formed, and the laser beam is scanned toward a parallel direction to a pair of parallel sides (long sides in FIG. 3B). By doing this, a groove with a fixed width can be formed. As the embodiment of the present invention, when the pulsed laser beam is used, the laser beam is scanned so that a part of a pair of sides (long sides in FIG. 3B) that has parallel beam spot overlaps with a part of a pair of the sides that has parallel beam spot of the last shot. Since the edge of the groove opening is formed by a straight line part of the rectangular beam spot, it becomes a straight line without bumps.

From a point of easiness of control, in the substrate 12, it is preferable that the beam spot is formed so that a direction of a pair of sides of which beam spot is parallel is parallel to the X direction and the Y direction.

Moreover, the pierced hole of the mask 5 that is focused on the substrate 12 is not necessary to be rectangle. When the beam spot is formed in a shape having a parallel pair of sides and the laser beam is scanned toward a parallel direction to the parallel pair of sides, the groove with a fixed groove without bumps at the edge of the opening can be processed.

Figure 4A:
FIG. 4A is an example of a pierced hole of a mask.

FIG. 4A is an example of a pierced hole of a mask. The pierced hole of the mask 5 is formed to be a shape having a parallel pair of sides. Other pair of sides connected the above a pair of sides each other is bending toward inside. When the cross section of the laser beam is reformed or shaped by using the mask having the above pierced hole, a beam spot with a shape having a parallel pair of sides can be formed.

Figure 4B:
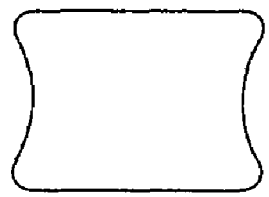
FIG. 4B is a schematic view showing a hole to be opened on the substrate when the pierced hole shown in FIG. 4A are focused on the substrate.

FIG. 4B is a schematic view showing a hole to be opened on the substrate when the pierced hole shown in FIG. 4A is focused on the substrate. By forming the same holes as the above hole continuously in a parallel direction to the parallel pair of sides, a groove with a fixed width that does not have bumps at the edge of the opening can be processed. Moreover, since an accumulated energy density of the laser beam that irradiates to a peripheral of the edge of the groove is larger than an accumulated energy density of the laser beam that irradiates in the center of the groove, the side of the groove can become closer to verticality.

Moreover, when only a groove that extends to one direction is firmed by the laser process as shown in FIG. 3B, one dimensional galvano scanner and a polygon scanner having an oscillating mirror may be used. At that time, scanning direction of the scanner and a direction of one pair of sides with parallel beam spot are agreed.

The cone optical system 4 will be explained with reference to FIGS. 5A to 5C. As described above, the cone optical system 4 converts the beam profile of the incoming laser beam in order to make the cross section of the beam weak in the central part and to make it strong in the peripheral.

Figure 5A:
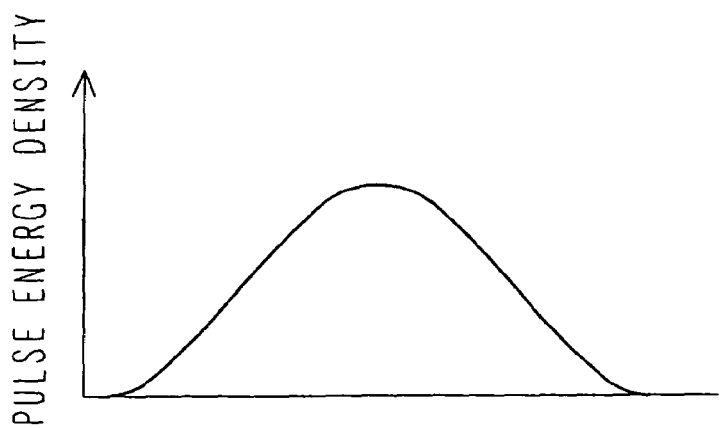
FIG. 5A is a schematic graph showing energy density for one pulse in the cross section of the pulsed laser beam radiated from the laser source.

FIG. 5A is a schematic graph showing energy density for one pulse in the cross section of the pulsed laser beam radiated from the laser source 1. Generally, the pulsed laser beam is high in pulse energy density in the central part of the cross section, and becomes low in pulse energy density as close to the peripheral area. The cone optical system 4 reverses the central part and the peripheral area of the irradiated laser beam by two cone lenses 4a and 4b before the radiation. Therefore, the beam profile of the laser beam to be radiated from the cone optical system 4 has a weak distribution in the central part of the beam cross section and a strong distribution in the peripheral area.

Figure 5B:
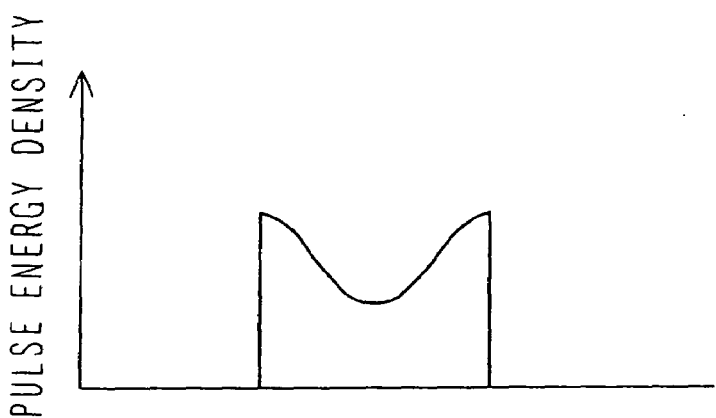
FIG. 5B is a schematic graph showing energy density for one pulse in the cross section of the pulsed laser beam of which the pulse energy density distribution is converted by a cone optical system.

FIG. 5B is a schematic graph showing energy density for one pulse in the cross section of the pulsed laser beam after the radiation from the cone optical system 4 and reforming with the mask 5. The beam has a weak distribution in the central part of the beam cross section and a strong pulse energy density distribution in the peripheral area.

Figure 5C:
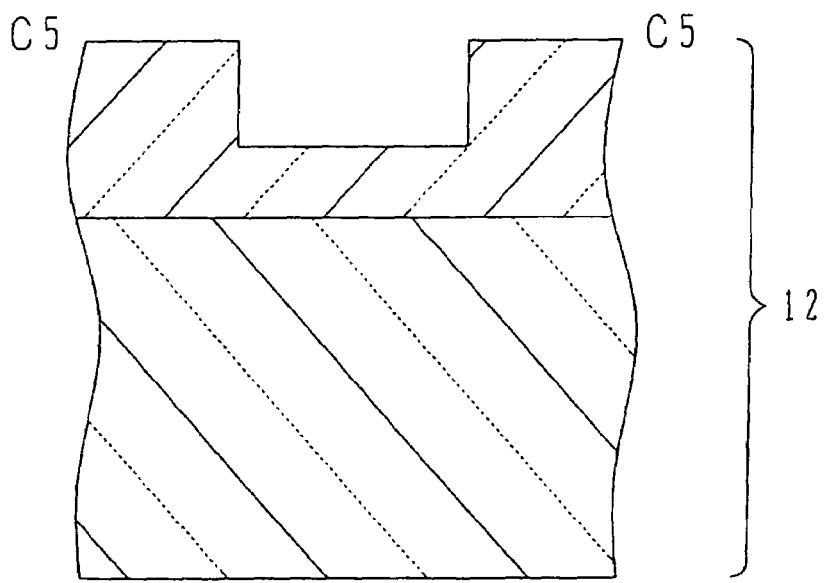
FIG. 5C is a schematic cross sectional view of the hole processed by the pulsed laser beam having the pulse energy density distribution shown in FIG. 5B.

FIG. 5C is a schematic cross sectional view of the substrate 12 cut along C5-C5 line in FIG. 3B. The laser beam having the beam profile shown in FIG. 5B is concentrated by the object lens 6 to be irradiated to the substrate 12. By that, an inclination angle of the sides can be close to 90 degree on the ITO film of the substrate 12. Therefore, the groove shown in FIG. 3 is not only formed to have the opening edge of straight line, but also has sheer side walls.

Moreover, synchronizing with the movement of the galvano scanner, the pulse energy of the pulsed laser beam is adjusted, and a better process can be executed. When the incident angle of the laser beam which irradiates to the substrate 12 becomes large, a beam spot area at the irradiating position becomes large. Therefore, when the pulse energy of the laser beam scanned by the galvano scanner is fixed at a fixed value, the pulse energy density of the laser beam at the irradiating position becomes small as the incident angle becomes large, and change in processitivity is generated. In order to keep a fixed processitivity, there are some cases to keep a fixed value of the pulse energy density of the laser beam at the irradiating position.

A variable attenuator 2, with synchronization to the movement of the galvano scanner 7, changes the pulse energy of the laser beam radiated from the laser source 1. Based on the synchronization signal transmitted from the controller 11, when the laser beam is irradiated to the substrate 12 at a large incident angle, an attenuation rate of the pulse energy makes small, and the pulse energy of the beam radiated from the variable attenuator 2 is increased. By doing that, the pulse energy density at the irradiating position of the laser beam can be kept the fixed value.

Moreover, it is not necessary to keep the fixed value of the pulse energy density. When the incident angle of the laser beam to the substrate 12 changes, as the change in pulse energy density at the irradiating position makes small, the processing quality can be improved when the attenuation rate of the pulse energy by the variable attenuator 2.

Moreover, when the laser beam is irradiated on the substrate 12 to scan, synchronizing with the movement of the galvano scanner 7 and changing the focus magnification rate (reduction rate) of the pierced hole of the mask 5, the pulse energy density at the irradiating position of the laser beam can be kept the fixed value.

$$\Delta_2 = f^2 \times \Delta_1/(b-f-\Delta_1)/(b-f) \quad (2)$$

$$[(a+\Delta_2)/(b-\Delta_2)]^2 = (a/b)^2/\cos\theta \quad (3)$$

In order to satisfy the both of the above equations, $\Delta_1$ and $\Delta_2$ are determined with corresponding to the incident angle $\theta$ to the substrate 12 (an angle made by a normal and the angle of incidence), and in order to the optical length from the mask 5 to the object lens 6 be $a+\Delta_2$, and in order to the optical length from the object lens 6 to the irradiating position on the substrate 12 be $b-\Delta_2$, the mask 5 and the object lens 6 may be moved corresponding to the incident angle $\theta$. Here, $a$ is the optical length from the mask 5 to the object lens 6 when the incident angle $\theta$ is 0, and $b$ is the optical length from the object lens 6 to the irradiating position on the substrate 12. Also, $f$ is the focus point distance of the object lens 6. Although the equations (2) and (3) are not strictly satisfied, the quality of the laser process can be improved by changing the focus magnification rate in order to make the change in beam spot area smaller when the incident angle changes. When the incident angle becomes large, the focus magnification rate (reduction rate) may be made smaller.

Figure 6:
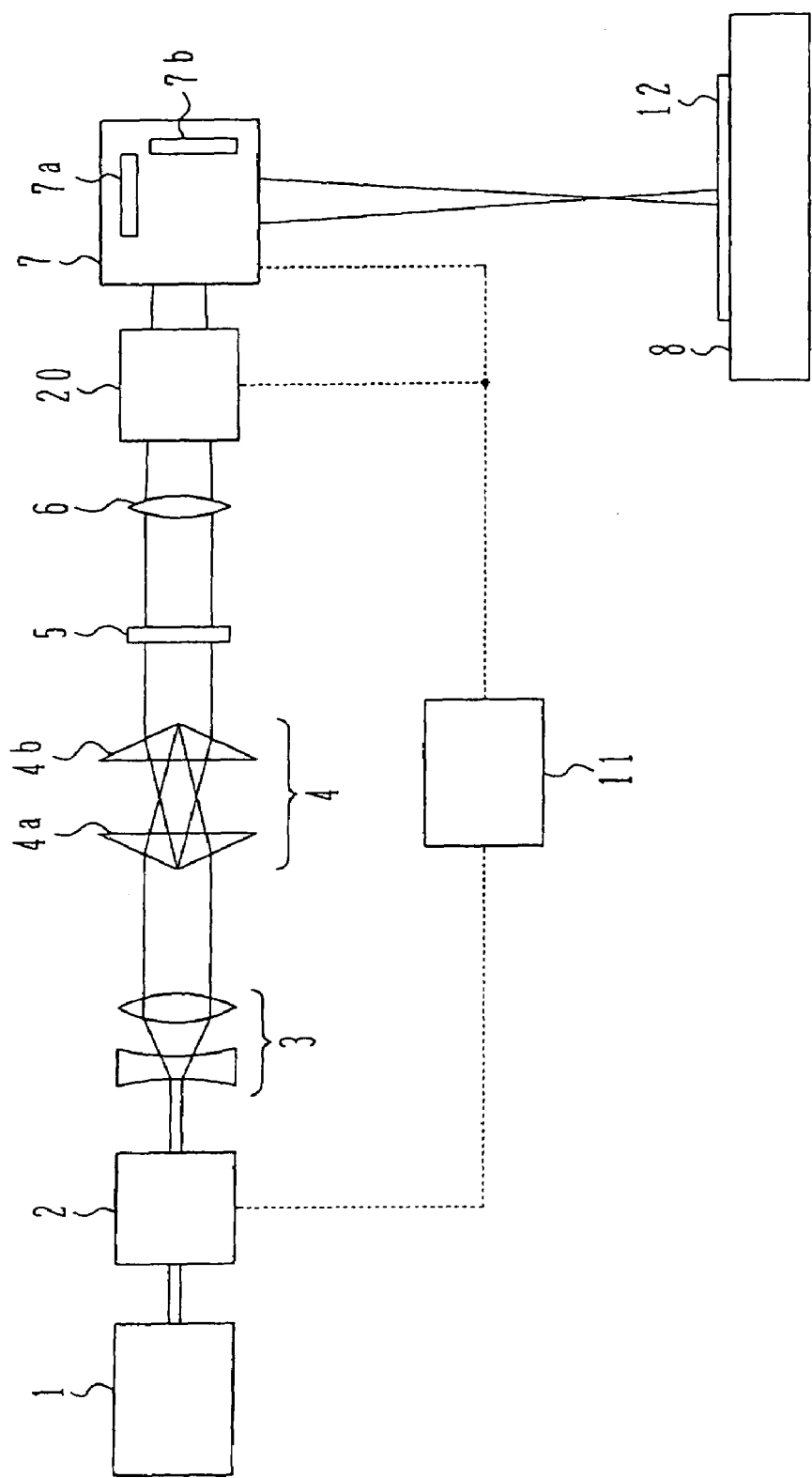
FIG. 6 is a schematic view of the laser processing apparatus according to a modified example of the first embodiment of the present invention.

FIG. 6 is a schematic view of the laser processing apparatus that equips a light path adjustment mechanism 20 that changes the optical length b from the object lens 6 to the irradiating position on the substrate 12 according to a modified example of the first embodiment of the present invention. The voice coil mechanisms 9 and 10 are removed from the laser processing apparatus shown in FIG. 1, and a light path adjustment mechanism 20 is added. Other structure is the same as the structure of the laser processing apparatus shown in FIG. 1. In the laser processing apparatus shown in FIG. 6, the optical length $a$ from the mask 5 to the lens 6 is fixed. By the light path adjustment mechanism, for example, synchronizing with the movement of the galvano scanner 7, the optical length $b$ from the object lens 6 to the irradiating position on the substrate 12 can be kept fixed during scanning the laser beam. By doing that, the pierced hole of the mask 5 is always focused at a fixed focus magnification rate (reduction rate), and a groove shown in FIG. 3B can be processed.

Figure 7:
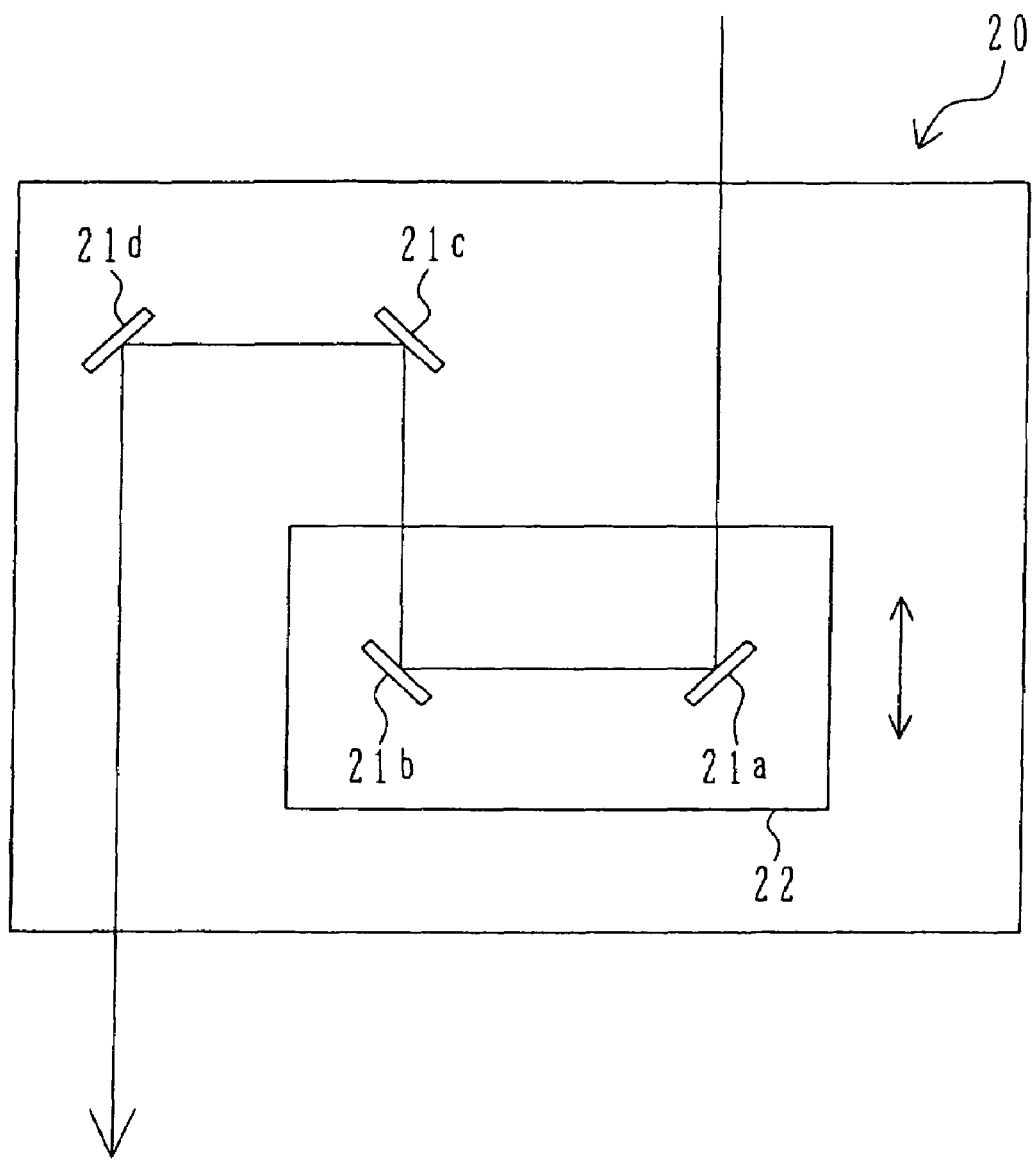
FIG. 7 is a schematic view showing a light path adjusting mechanism.

FIG. 7 is a schematic view showing the light path adjusting mechanism 20. The light path adjustment mechanism 20 is formed of four reflective mirrors 21a to 21d. Each of the four mirrors change a moving direction of the incoming laser beam, for example, at 90 degree, and the light path adjustment mechanism 20 radiates the laser beam to a parallel direction to the moving direction of the irradiated laser beam. The reflective mirrors 21a and 21b form a moving part 22. The moving part 22 can move to a direction of an arrow in the drawing. The optical length $b$ from the object lens 6 to the substrate 12 is adjusted by displacing the moving part 22. When the incident angle of the laser beam to the substrate 12 becomes large, the moving part 22 moves to upward in FIG. 7. By shortening the optical length of the laser beam in the light path adjustment mechanism 20, the light path $b$ is kept fixed. The movement of the moving part 22 is executed after receiving the signal from the controller 11. The controller 11 keeps the optical length $b$ from the object lens 6 to the substrate 12 shown in FIG. 6 fixed by synchronizing the movement of the galvano scanner to the movement of the moving part 22.

In the laser processing apparatus shown in FIG. 6, although the light path adjustment mechanism 20 is added for adjusting the optical length $b$, it also can be inserted between the mask 5 and the object lens 6 for adjusting the light path $a$. By using two light path adjustment mechanisms 20, the optical length $a$ and the optical length $b$ can be adjusted during scanning the laser beam, for example, in order to satisfy the equation (1).

Moreover, depending on the process to be executed, either one of the mask 5 and the object lens 6 may be moved. For example, with fixing the object lens 6, only the mask 5 can be moved in order to satisfy the equation (1).

Although the substrate wherein the ITO film is formed on the glass substrate is considered as the processing target, a substrate wherein a polyimide film is formed on a silicon substrate and the polyimide film part may be processed may be used. These are used as a solar battery substrate and a liquid-crystal substrate. Moreover, a touch panel which the ITO film is formed on the polyimide film, moreover, a semiconductor film or the like can be processed. Also, a film-type processing target can be processed.

Figure 8A:
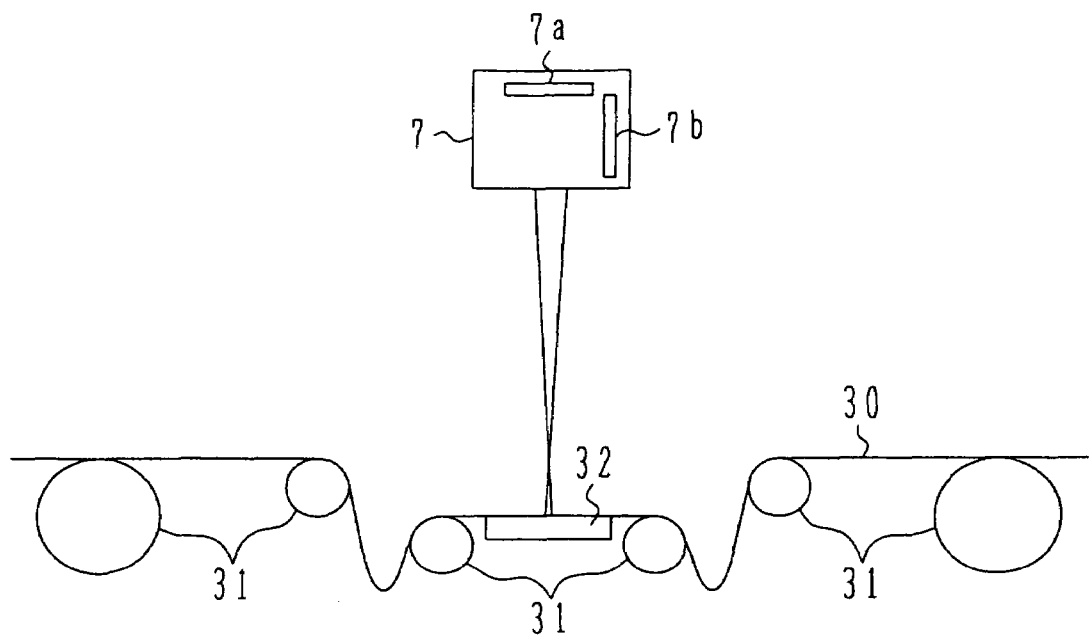
FIG. 8A and FIG. 8B are schematic views showing a career mechanism.

FIG. 8A is a schematic view of a carrier mechanism 31 for carrying a film 30. The film 30 is carried by the carrier mechanism 31. A vacuum chuck 32 fixes a predetermined processing position on the film 30 and determines a surface to be processed. By irradiating the laser beam scanned by the galvano scanner to the film 30 fixed by the vacuum chuck 32, the process at the predetermined process position is executed. When the process at the predetermined process position terminates, the carrier mechanism 31 carries the film 30, and other process position is fixed by the vacuum chuck to be processed.

Conventionally, the process is executed by moving the film 30 fixed by the vacuum chuck 32 at the XY stage and irradiating the beam by using a fixed optics. In the embodiments of the present invention, the process is executed by scanning the beam by the galvano scanner, and executing the process by irradiating the beam at the process position. Therefore, the processing velocity can be faster.

Figure 8B:
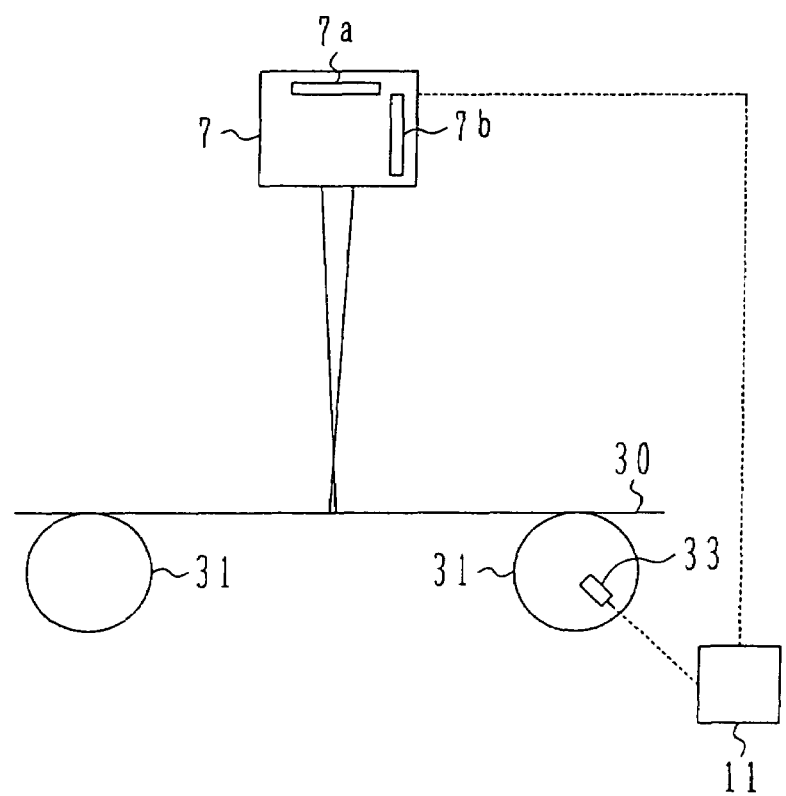
Figure 9:
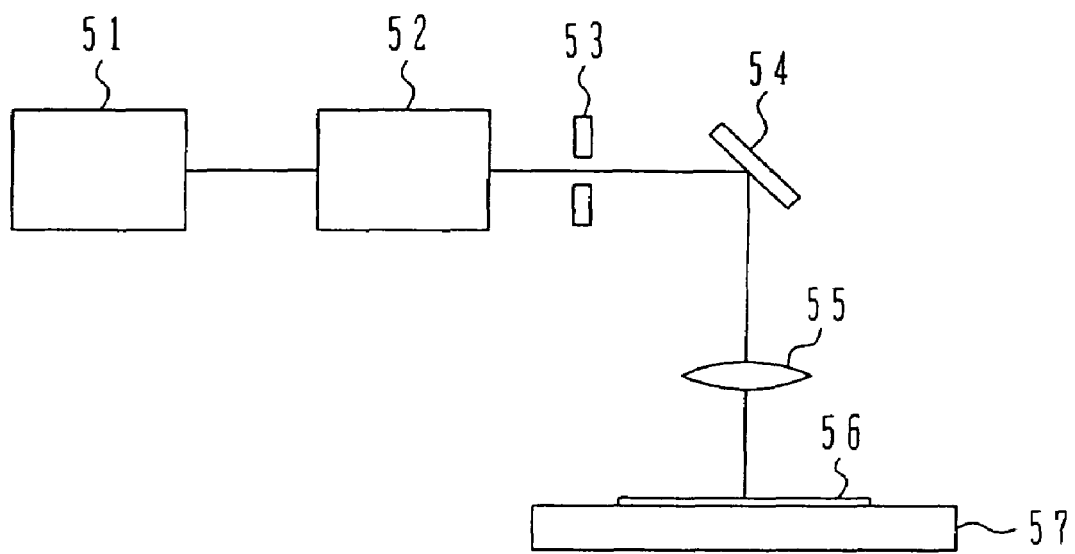
FIG. 9 is a schematic view of a conventional laser scribing apparatus.

FIG. 8B is a schematic view of the carrier mechanism 31 equipped with the rotary encoder 33. The rotary encoder 33 detects the velocity of the film 30 carried by the carrier mechanism 31. A detected result is transmitted to the controller 11, and the controller 11 calculates carried amount of the film 30 from the carrying velocity of the film 30. A control signal formed from the carrying velocity of the film 30, the carried amount and the data at the designated processing position determined on the film 30 is transmitted from the controller 11 to the galvano scanner 7. The galvano scanner 7 scans the laser beam after receiving the control signal and the process is executed by irradiating the beam at the predetermined processing position on the film 30.

Since the XY stage is not necessary, and the process can be executed carrying the film 30, the processing velocity can be faster.

By using the laser processing apparatus of which the cone optical system 4, the mask 5 and the voice coil mechanism 9 are removed from the laser processing apparatus shown in FIG. 1, a focus process can be executed. The laser beam is focused by the object lens 6 on the substrate 12. By the movement of the galvano scanner, the laser beam scans on the substrate 12. When the irradiating position of the beam on the substrate 12 is changed, the object lens 6 is moved to a parallel direction to the moving direction of the beam which passes through the object lens by the voice coil mechanism 10 so that the laser beam optical length b from the object lens 6 to the substrate 12 is kept to be fixed. By this move, the laser beam is always focused on the substrate 12. Therefore, the process in good quality can be realized.

Although the pulsed laser beam is used in the embodiments of the present invention, a continuous-wave laser beam may be used depending on the process to be executed. Although in the embodiments of the present invention, an Nd:YAG laser oscillator including a wave-length conversion unit is used, and a high frequency wave of three times of the Nd:YAG laser is radiated, a basic wave of the solid laser to five-times high frequency wave can be used. Also, a $CO_2$ laser and the like can be used.

Also, in the embodiments of the present invention, although the galvano scanner is used as a fast scanning optical system, a fast scanning optical system using a polygon mirror can be used. By moving the processing target at the XY stage, the beam is scanned by using the fast scanning optical systems without changing the irradiating position of the laser beam. Then the processing velocity can be improved since the irradiating position of the laser beam is changed.

In the focus processing method described in the above, the laser beam is always focused on the surface of the substrate. Next, a method for executing a high quality process by adjusting the positioning relationship between the focus of the laser beam and the surface of the substrate corresponding to the irradiating position of the laser beam to the surface of the substrate will be explained.

Figure 12A:
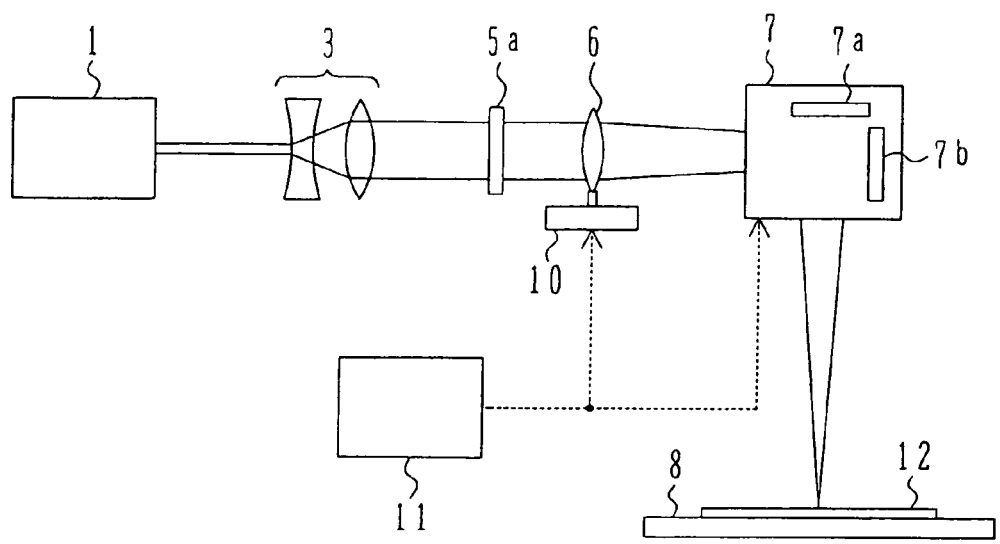
FIG. 12A is a schematic view of a laser processing apparatus according to the second embodiment of the present invention.

In a laser processing apparatus according to the second embodiment of the present invention shown in FIG. 12A, the cone optical system 4, the mask 5 and the voice coil mechanism 9 are removed from the laser processing apparatus shown in FIG. 1. Moreover, a variable attenuator 2 is removed, and it equips a circular pierced hole between the expander 3 and the object lens 6, and an aperture 5a that adjusts a beam radius is positioned. It is not necessary to focus the pierced hole of the aperture 5a on the surface of the substrate 12.

By using the voice coil mechanism 10, pulse energy density of the laser beam irradiated on the surface of the substrate is adjusted by moving the object lens 6 to the parallel direction to the moving direction of the laser beam that passes through the object lens 6 and making the laser beam focus be close to and away from the surface of the substrate.

By the control signal transmitted from the controller 11, the galvano scanner 7 swings the laser beam to a desired moving direction at a desired timing. By the control signal transmitted from the controller 11, the voice coil mechanism 10 is synchronized with the galvano scanner 7 to move, and the laser can be irradiated to the substrate 12 at desired pulse energy density corresponding to the irradiating position of the laser beam.

Figure 13:
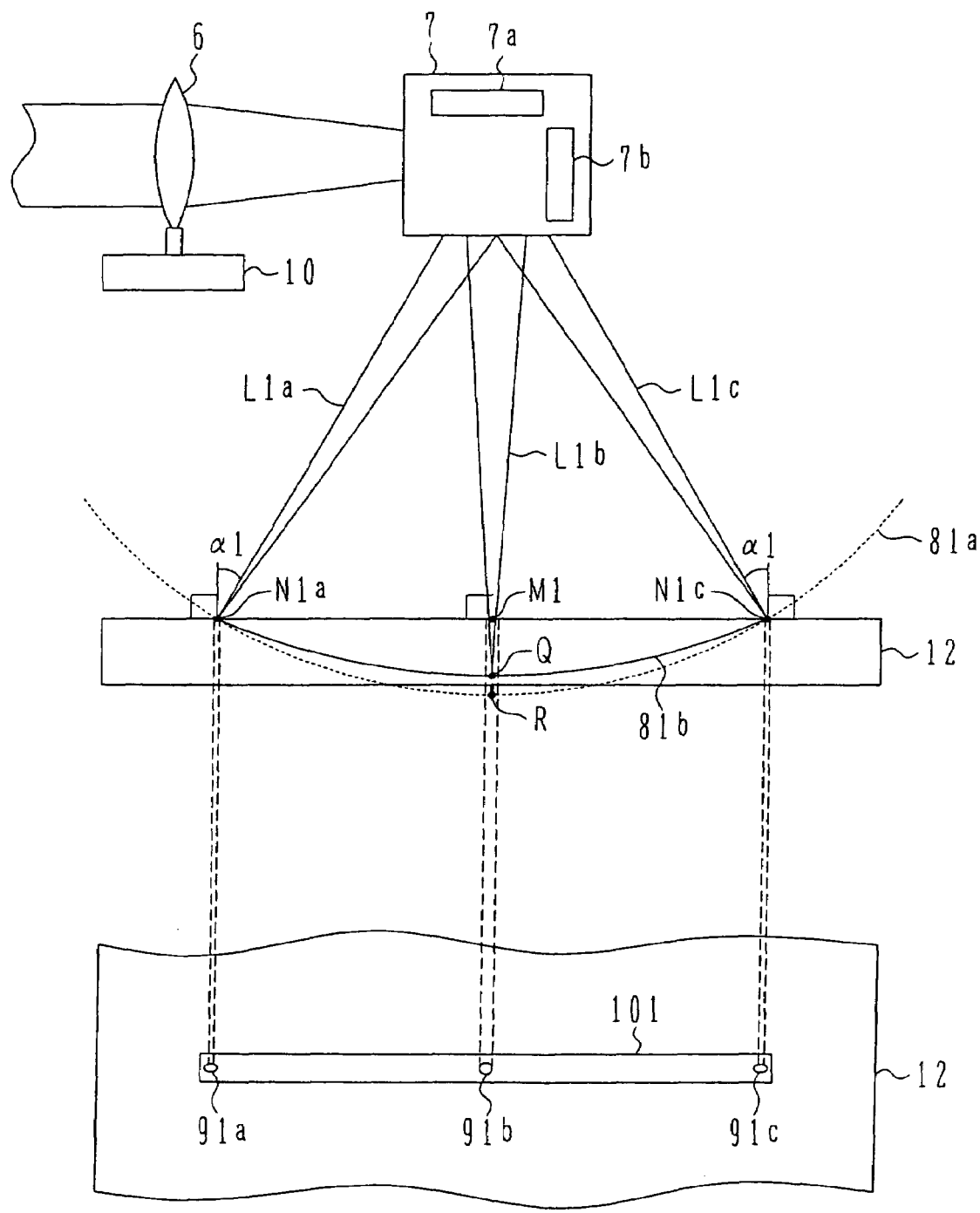
FIG. 13 is a schematic view showing a light path of the laser beam in the laser processing apparatus according to the second embodiment of the present invention.

With reference to FIG. 13, an example of a laser processing method using the laser processing apparatus in FIG. 12A will be explained. An upper part in FIG. 13 schematically shows a light path of the pulsed laser beam scanning on the substrate 12 via the galvano scanner 7.

A laser beam L1b irradiates to an irradiating position M1 vertical to the surface of the substrate. Laser beams L1a and L1c irradiate to irradiating positions N1a and N1c at incident angle α1. The irradiating position M is positioned at a center of a line between the edge of the irradiating position N1a and the edge of the irradiating position N1c.

A lower part in FIG. 13 shows a surface of the substrate looked at from the galvano scanner 7. Each of beam spots 91a, 91b and 91c shows either one of beam spots on the surface of the substrate (that is, the irradiating positions N1a, M1 and N1c) of the laser beams L1a, L1b and L1c.

Figure 10A:
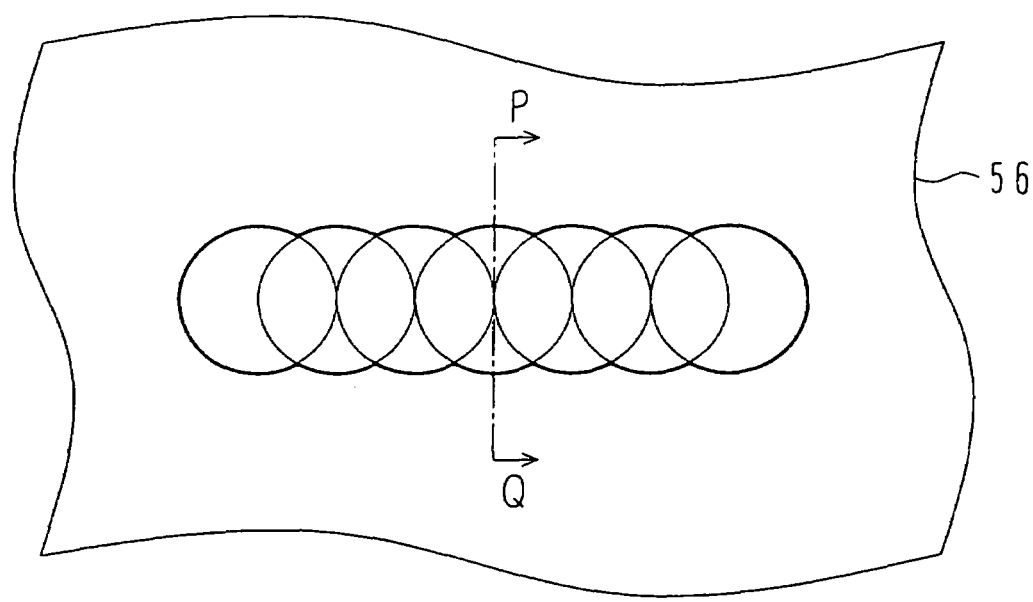
FIG. 10A and FIG. 10B are schematic plan views of a substrate processed by the conventional laser scribing apparatus.
Figure 10B:
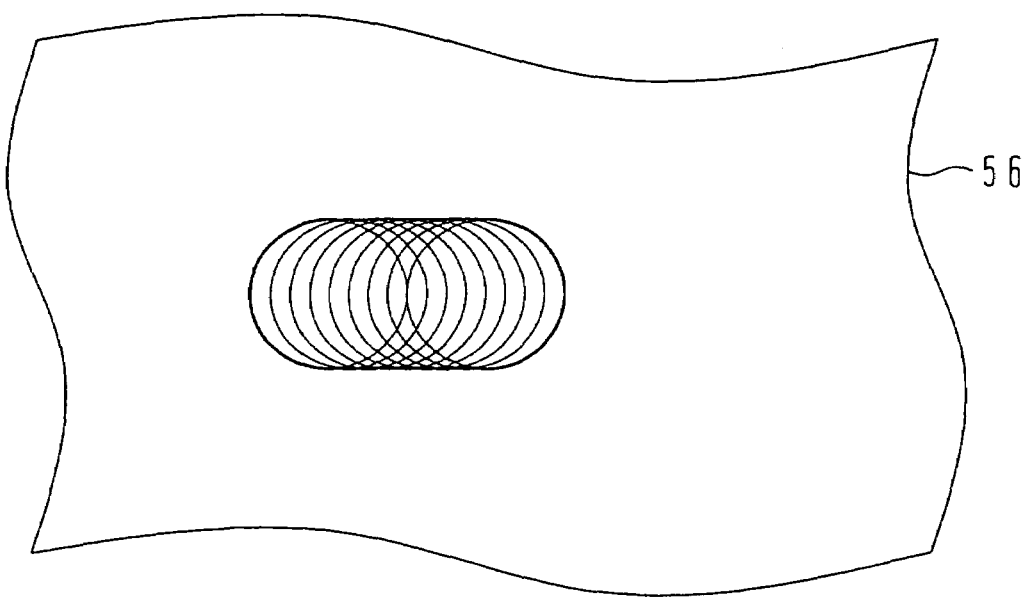
Figure 11:
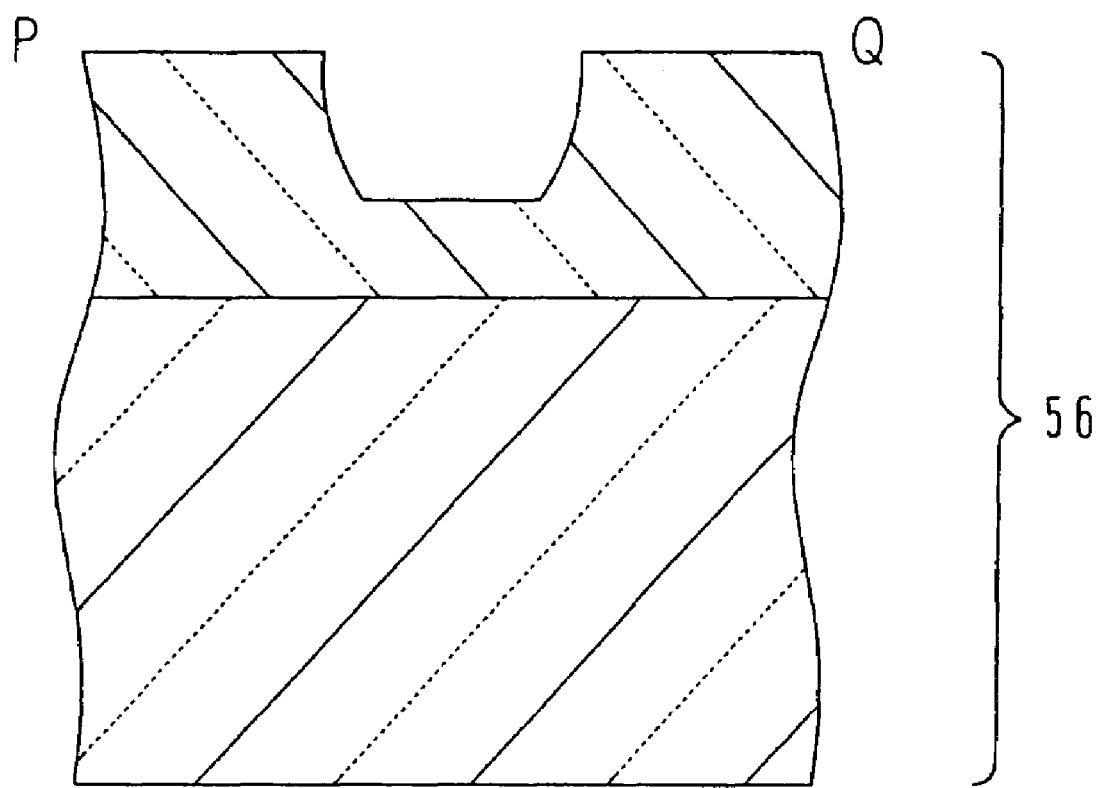
FIG. 11 is a schematic cross sectional view of the substrate processed by the conventional laser scribing apparatus.

Swinging the moving direction of the laser beam from the light path of the laser beam L1a to the light path of the laser beam L1c, irradiation of the pulsed laser beam is repeated. Then, as same as those shown in FIGS. 10A and 10B, a groove 101 is formed on the surface of the substrate so that the holes formed at the irradiating position of each laser continue.

First, when the laser beam L1a that forms a starting point of the groove 101 is irradiated, the position of the object lens 6 is set so that the laser beam L1a is focused at the irradiating position N1a. Moreover, a point where the size of the beam spot becomes minimum is called a focus of the laser beam.

Then, when the laser beam L1c that forms the ending point of the groove 101 is irradiated, the position of the object lens 6 is so controlled that the laser beam L1c is focused at the irradiating position N1c. Since the optical length from the object lens 6 to the irradiating positions N1a and N1c is almost the same, the position of the object lens 6 at a time of starting and finishing of the groove process may be considered to be the same. Moreover, the incident angles of the laser beam L1a and L1c are the same, and areas of the beam spots 91a and 91c are considered to be the same.

First, it will be explained what kind of problem arises when the groove is formed by scanning the laser beam in a state that the object lens 6 is fixed at this position.

When the object lens 6 is fixed at a position where the laser beam L1a is focused at the irradiating position N1a (or the laser beam L1c is focused at the irradiating position N1c), a virtual surface which a locus of the focus of the laser beam that is assigned the moving direction by the galvano scanner 7 draws is a light concentrating surface 81a. A point R on the light concentrating surface 81a shows a focus position of the laser beam L1b.

At the irradiating position other than the irradiating positions Na1 and N1c, the laser beam irradiates to the substrate on the way of focusing. As the distance from the irradiating position to the focus point becomes long, the beam radius at the irradiating position becomes larger than the beam radius at the focus point.

The pulse energy density of the laser beam is normally higher than the peripheral of the outer circumference of the beam cross section. When the beam radius becomes large, the pulse density at each position in the beam cross section becomes low. Therefore, a region that has the pulse energy density equal to or more than a threshold value that can process the substrate is limited to around the center of the beam cross section, although the beam radius becomes large.

In the peripheral area of the irradiating position N1a and N1c, a wide groove is formed by irradiating the laser beam with a small diameter and having the pulse energy density equal to or more than a threshold value from the center to the outer circumference of the beam cross section at the high pulse energy density. On the other hand, in the peripheral area of the irradiating position M1, a narrow groove is formed by irradiating the laser beam with a large diameter and having the pulse energy density equal to or more than a threshold value only at the small center area of the beam cross section at the low pulse energy density. As described above, the widths of the grooves are varied depending on the positions they are formed.

Moreover, the distance from the irradiating position M1 of the laser beam L1b to the point R on the light concentrating surface 81a becomes longer as the incident angle α1 becomes large. Therefore, as the incident angle α1 becomes large, the difference between the beam radius of the laser irradiated to the N1c and the beam radius of the laser irradiated at the irradiating position M1 becomes large. That is, the difference of the width between the edge and the center of the groove becomes clear. Since the incident angle α1 is incident angle of the laser beam to form the edge of the groove, for example, it becomes large when a long groove is to be formed on a large substrate.

Next, a method for forming a groove by scanning the laser beam adjusting the focus position by moving the position of the object lens 6 will be explained. When the focus position of the laser beam is adjusted, the beam radius of the laser beam irradiated on the substrate is adjusted, and the pulse energy density on the surface of the substrate is adjusted.

It is considered where to focus the laser beam L1b that irradiates to the irradiating position M1. By setting the focus closer to the irradiating position M1 than the point R on the light concentrating surface 81a, the beam radius becomes small, and it can be corrected in order to increase the pulse energy density of the irradiating position M1. When the focus comes closer to the irradiating position M1, the pulse energy density at the irradiating position M1 becomes higher than the pulse energy density at the irradiating positions N1a and N1c.

Since the laser beam L1b irradiates to the surface of the substrate vertically, the beam spot at the irradiating position M1 is circular. On the other hand, since the laser beams L1a and L1c irradiate to the surface of the substrate from slant at the incident angle α1, the beam spots 91a and 91c are shapes of spread ellipse. That is, the pulse energy density at the beam spot 91b when the laser beam L1b is focused at the irradiating position M1 is higher than the pulse energy density at the beam spots 91a and 91c.

Then, the focus point of the laser beam L1b is set to a little deeper (far from the irradiating position M1 toward inside the substrate) position than the irradiating position M1, and area of the beam spot 91b is made to be the same as the area of the beam spots 91a and 91c. By doing that, the laser can be irradiated to execute the process at the same pulse energy density as the irradiating position N1a, N1c or M1.

At other irradiating position on the groove 101, the pulse energy density is made to be equal so that the area of the beam spot is kept to be fixed, and the process may be executed. Track of the focus at a time of scanning on the groove 101 in a condition without changing the area of the beam spot is a light concentrating surface 81b. The focus position of the laser beam L1b is a point Q on the light concentrating surface 81b.

It will be explained how to adjust the position of the object lens 6 when the focus is moved along the light concentrating surface 81b. First, when the laser beam L1a is irradiated, the position of the object lens 6 is so controlled that the laser beam is focused at the irradiating position N1a. This position is called a standard position.

When the laser beam is scanned from the irradiating position N1a to M1, the object lens 6 is gradually moved from the standard position to the direction of the laser source. Then, the focus is moved along the light concentrating surface 81b that is closer to the surface of the substrate than the light concentrating surface 81a, and the area of the beam spot becomes large, and it is controlled that the pulse energy density becomes low. A moving distance from the standard position of the object lens is zero for the laser beam L1a that irradiates to the irradiating position N1a. The moving distance is set to increase as the laser moves to the irradiating position M1, and the moving distance of the laser beam L1b that irradiates to the irradiating position M1 is maximum.

When the laser beam is continuously scanned from the irradiating position M1 to N1c, the object lens 6 may gradually close to the standard position. The moving distance from the standard position of the object lens is made to decrease as the laser moves to the irradiating position N1c, and the moving distance of the laser beam L1c that irradiates to the irradiating position N1c is made to be zero.

As described in the above, by scanning the laser with adjusting the position of the object lens 6 in order to move along the light concentrating surface 81b, it is controlled that the width changes depending on the position, and the groove can be formed.

Next, it is summarized how to move the object lens. When the scan continues without moving the position of the object lens, and when the pulse energy density on the surface of the substrate becomes low, the object lens is moved so that the focus of the laser beam becomes close to the irradiating position along the moving direction of the laser beam to control the decline of the pulse energy density. When the scan continues without moving the position of the object lens, and when the pulse energy density on the surface of the substrate becomes high, the object lens is moved so that the focus of the laser beam becomes far from the irradiating position along the moving direction of the laser beam to control the rise of the pulse energy density.

Although the method for focusing on the surface of the substrate at the irradiating position of both sides of the groove has been explained as an example of the process, the focus point may be set at any other irradiating position. When the area of the beam spot at each irradiating position is made to be fixed, the process can be executed with equal pulse energy density, and a fixed processitivity can be kept to any irradiating position.

Moreover, although the pulse energy density of the laser beam to be irradiated is not kept to be strictly fixed at each irradiating position, a high quality process can be executed by suppressing a variation of the pulse energy density at the irradiating position at a time of changing the irradiating position.

Although the example of the groove process (the scribing process) has been explained, a piercing process may be executed. Although the example of scan the galvano scanner to the one-dimensional direction has been explained, a process all over the surface of the substrate may be executed by scanning to the laser beam in two-dimensional directions. Although the example of the process to use the pulsed laser beam has been explained, the laser beam may be a continuous-wave. When the process is executed by the continuous-wave laser beam, it is controlled that power density at a surface to be processed changes by the irradiating position.

The pulse energy density of the laser beam to be irradiated to the substrate can be adjusted by the variable attenuator instead of moving the object lens 6.

Figure 12B:
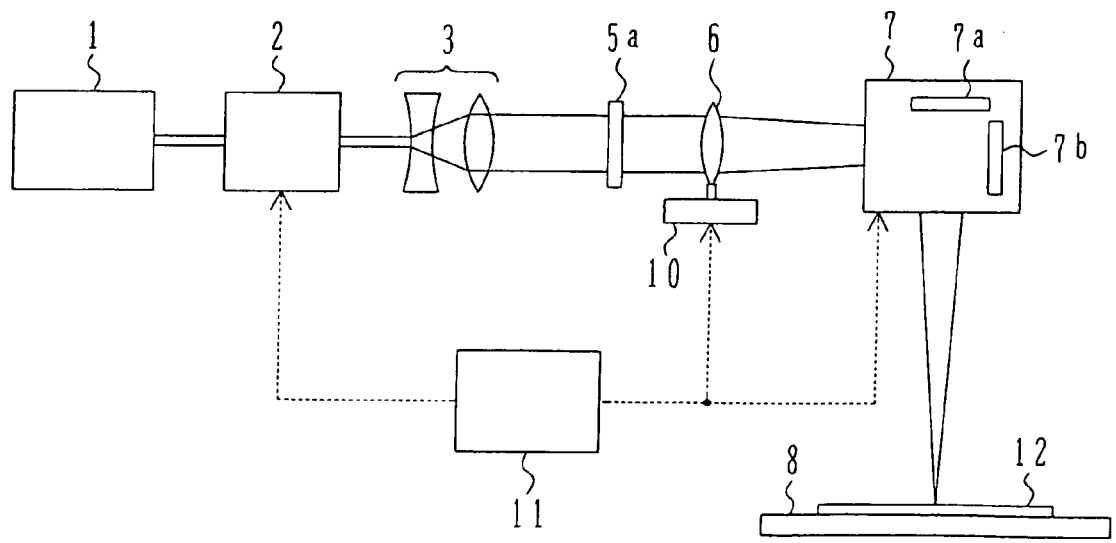
FIG. 12B is a schematic view of a laser processing apparatus according to a modified example of the second embodiment of the present invention.

In the laser processing apparatus according to the modified example of the second embodiment of the present invention shown in FIG. 12B, a variable attenuator 2 is added to the laser processing apparatus shown in FIG. 12A. The variable attenuator 2 synchronizes with the movement of the galvano scanner based on the control signal transmitted from the controller 11, and the power of the pulsed laser beam to be irradiated to the substrate 12 can be attenuated at desired attenuation rate.

Figure 14:
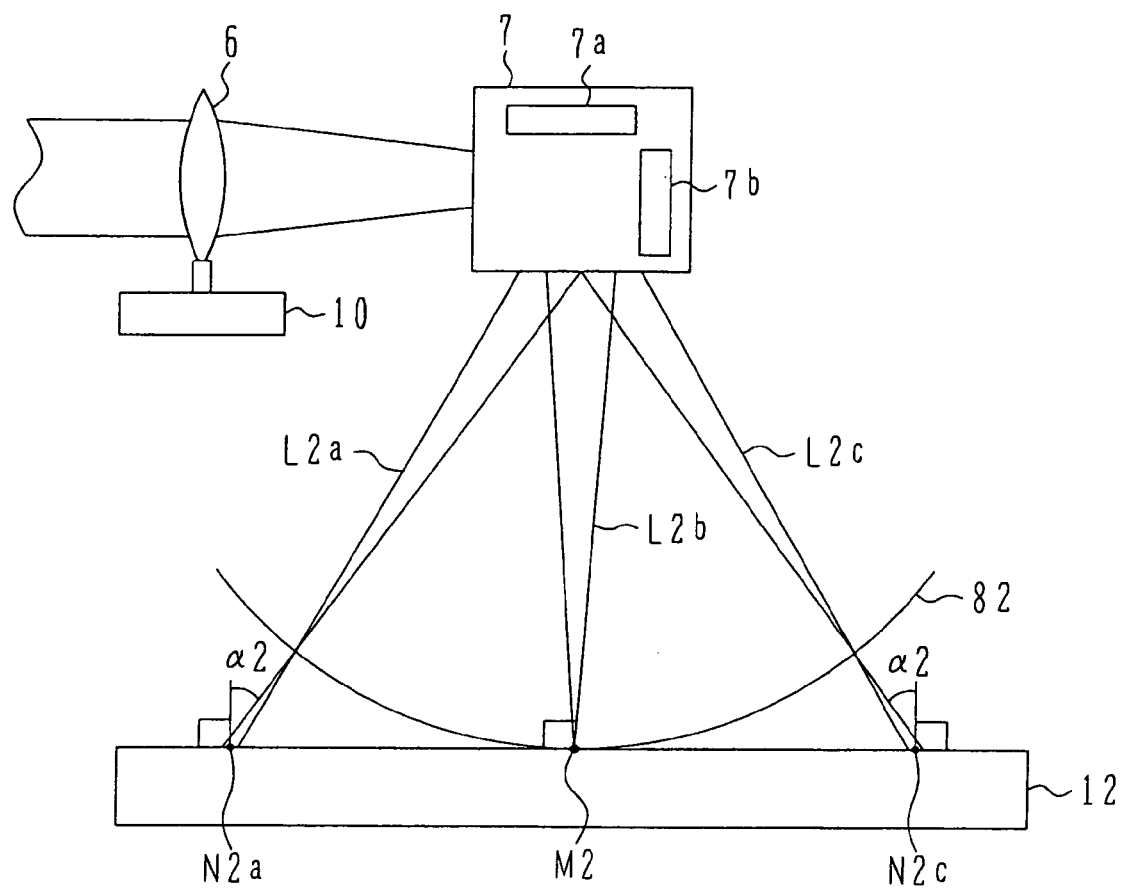
FIG. 14 is a schematic view showing a light path of the laser beam in the laser processing apparatus according to a modified example of the second embodiment of the present invention.

With reference to FIG. 14, an example of a laser processing method used the variable attenuator will be explained. FIG. 14 schematically shows a light path of the pulsed laser beam that scans on the substrate 12 via the object lens 6 and the galvano scanner 7.

Laser beam L2b irradiates to an irradiating position M2 vertical to the surface of the substrate. Laser beams L2a and L2c irradiate to irradiating positions N2a and N2c. Irradiating position M2 is positioned at the center of a line between the irradiating position N2a and irradiating position N2c.

The object lens 6 is fixed to a position to focus the laser beam L2b at the irradiating position M2. A track of the focus of the laser beam altering the moving direction by the galvano scanner 7 draws a virtual surface, and it is a light concentrating surface 82.

As same as the explanation with reference to FIG. 13, swinging the moving direction of the laser beam from the light path of the laser beam L2a to the direction of the light path of the laser beam L2c, irradiation of the pulsed laser beam is repeated to form a groove on the surface of the substrate.

As the irradiating position of the laser beam goes away from the irradiating position M2, a distance from the position where the laser beam focuses to the position to irradiate to the substrate becomes long. Since the laser beam after passing through the focal point is divergent pencil of rays, the beam spot of the surface of the substrate becomes large as the distance from the focal point to the irradiating position becomes long.

Also, as the irradiating position goes away from the irradiating position M2, the incident angle of the laser beam to the substrate becomes large. Also, in a case that the laser beam that has same sizes beam radius is irradiated, the beam spot of the surface of the substrate becomes large as the incident angle becomes large.

As explained with reference to FIG. 13, the pulse energy density in a large beam spot declines all over the beam section, a region that can process the substrate and that is equal to or more than a threshold value is limited to around the center of the beam cross section. Therefore, the width of the groove formed by the irradiation of large beam spot becomes narrow.

When the groove is formed by irradiating the laser at a fixed pulse energy to any irradiating position, the width of the groove around the center becomes wide, and the width of the groove at the edge becomes narrow.

Here, the power is adjusted by the variable attenuator 2 corresponding to the irradiating position so that the pulse energy density on the surface of the substrate at any irradiating position is fixed. The attenuation rate of the power is minimum when the edge of the groove is processed. Then, as the processing point moves toward the center of the groove, the attenuation rate is increased, and it will be maximum when the irradiating position M2 where is the center of the groove is irradiated. By doing that, it is controlled that the width changes depending on the position, and the groove is formed.

Moreover, in order to uniform the pulse energy density of the laser beam to be irradiated to the substrate, it may be combination of that the focal point is moved by moving the object lens 6 in the voice coil mechanism 10 and that the power of the pulsed laser beam is attenuated by the variable attenuator 2.

Moreover, the laser beam may be a continuous-wave. When the process is executed by the continuous-wave laser beam, the power of the continuous-wave laser beam is controlled by the variable attenuator in order to suppress the power density at the surface to be processed to change depending on the irradiating position.

For example, in the process of the glass basic material formed the ITO film on the surface, the size of the substrate tends to be large. When the substrate becomes large, and the area to be processed becomes large, a case that the moving amount of the object lens 6 becomes large occurs in the process to execute by moving the object lens corresponding to the irradiating position of the laser beam as explained with reference to FIG. 13. From a view point of easiness of the control, it is preferable that the moving amount of the object lens 6 can be made to be small.

Next, a laser processing apparatus according to the third embodiment of the present invention that can make the moving distance of the focal point of the laser beam long in a state that the moving distance of the object lens 6 is controlled to be short will be explained.

Figure 15A:
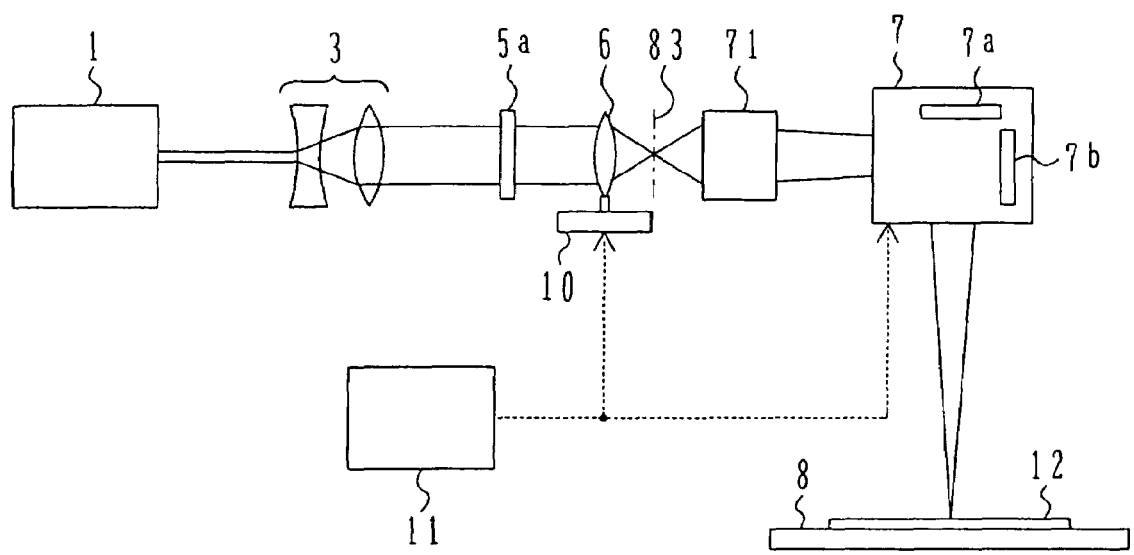
FIG. 15A is a schematic view of the laser processing apparatus according to the third embodiment of the present invention.

In the laser processing apparatus shown in FIG. 15A, a second light concentrating lens 71 is added between the object lens 6 and the galvano scanner 7 in the laser processing apparatus shown in FIG. 12A. Moreover, the object lens 6 is called a first light concentrating lens 6 in the explanation of FIG. 15A.

The laser beam radiated from the aperture 5a irradiates to the first light concentrating lens 6. The first light concentrating lens 6 concentrates the laser beam on a virtual first light concentrating surface 83. The laser beam passed through the first light concentrating surface 83 becomes divergent pencil of rays to irradiates to the second light concentrating lens 71. The laser beam concentrated by the second light concentrating lens 71 swings the moving direction to the galvano scanner to irradiate to the substrate 12.

Next, the moving amount of the first light concentrating lens 6 will be explained. When the first light concentrating surface 83 is made to be close to the second light concentrating lens 71, the focal point of the laser beam concentrated by the second light concentrating lens 71 moves to a direction that the laser beam moves. The moving distance of the first light concentrating surface 83 is d1, and the moving distance of the focal point of the laser beam is d2. Also, the number of the openings of the second light concentrating lens 71 to the laser beam that irradiates to the second light concentrating lens 71 is NA1, and the number of the openings of the second light concentrating lens to the concentrated beam passed through the second light concentrating lens 71 is NA2. If the magnification P is defined to the following equation:

$$P=NA1/NA2$$

The, the following equation can be obtained:

$$d2=d1 \times P^2$$

As obvious from the above equation, the magnification P is made to be large, the moving distance d2 of the focus can be lengthened, although the moving distance d1 of the first light concentrating surface 83 is shortened. For example, when the magnification P is 2, the focus point of the laser beam can be moved by 8 mm to the moving direction of the laser beam by making the first light concentrating surface 83 be closer by 2 mm to the second light concentrating lens 71.

The movement of the first light concentrating surface 83 is opened by moving the first light concentrating lens 6 to the optical axis direction. When the laser beam to irradiate to the first light concentrating lens 6 is parallel pencil of rays, the moving distance of the first light concentrating lens 6 and the moving distance of the first light concentrating surface is same. If the distance to move the first light concentrating lens 6 is equal to or less than about 2 mm, a linear actuator used the piezo driver mechanism can be used. By using the linear actuator used the piezo driver mechanism instead of the voice coil mechanism 10, the first concentrating lens 6 can be moved fast and precisely.

Figure 16:
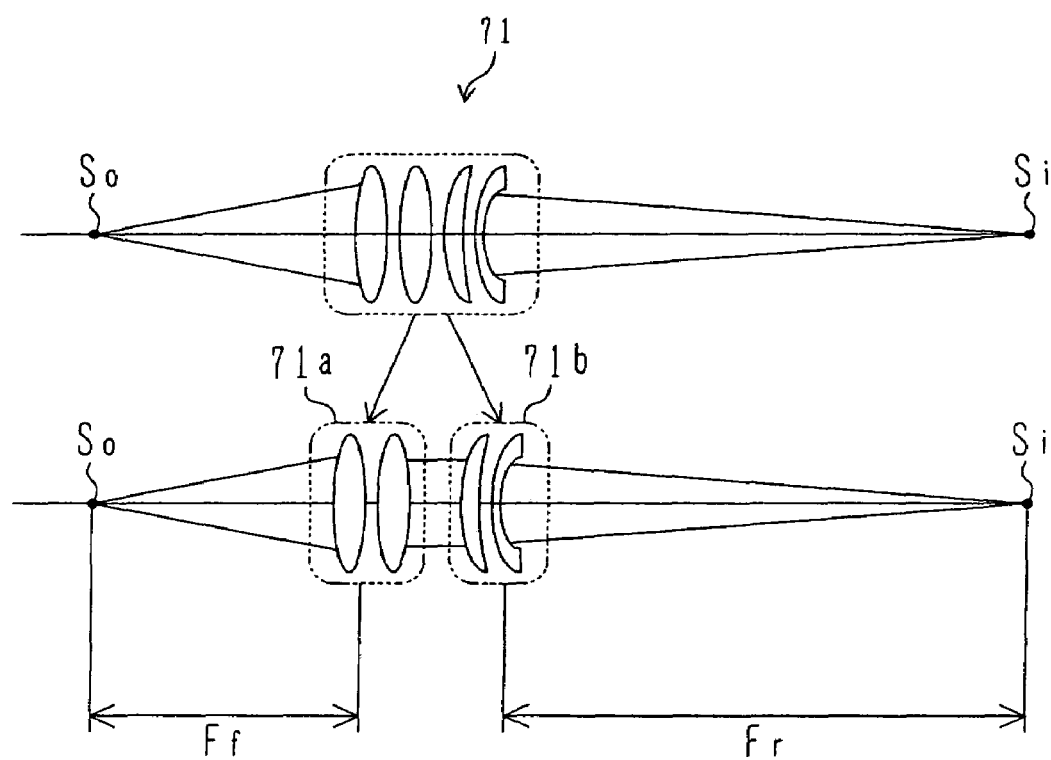
FIG. 16 is a schematic view showing a structural example of a secondary concentrating lens.

FIG. 16 shows an example of a structure of the second light concentrating lens 71. The second light concentrating lens 71 is consisted of plurality of lenses. An object focal point So and an image focal point Si are in a relationship of conjugate. This object focal point So is equal to the position of the beam spot on the first light concentrating surface 83 shown in FIG. 15A. This focus optical system is considered to be an optical system of infinity conjugate. The second light concentrating lens 71 is divided into front side lenses group 71a and back side lenses group 71b. The pencil of rays is made to be the parallel pencil of rays by the front side lenses group 71a. This parallel pencil of rays focuses on the image focal point Si by the back side lenses group 71b. Moreover, although there is a case that the second light concentrating lens 71 cannot be divided physically, it is considered that it can virtually be divided.

The front focal length of the front side lenses group 71a is Ff, and the back focal length of the back side lenses group 71b is Fr. At this time, the magnification defined with the above-described equation can be expressed as following:

$$P=Fr/Ff$$

Figure 15B:
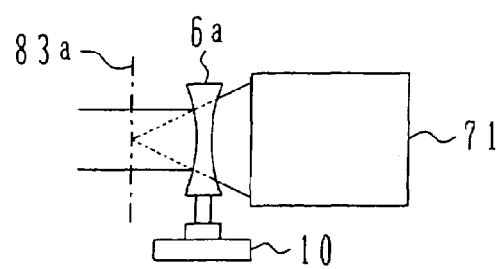
FIG. 15B is a schematic view showing other structural example of a primary concentrating lens according to the third embodiment of the present invention

Although in the laser processing apparatus shown in FIG. 15A, the first light concentrating lens 6 is consisted of a convex lens, as shown in FIG. 15B, it may be consisted of a concave lens. At this time, the first light concentrating surface 83a becomes a virtual image and appears closer to the laser source side than the concave lens 6a.

By making the magnification P large, the focus point position of the laser beam to be irradiated to the substrate can largely changed being the moving distance of the first light concentrating lens 6 controlled to be short. To obtain a significant effect, it is preferable that the magnification P equals or more than 2, and 4 or more is more preferable.

Since the beam spots 91a and 01c shown in FIG. 13 are the beam spots of the laser beam that irradiates obliquely to the substrate, they are ellipse. On the other hand, since the beam spot 91b is the beam spot of the laser that irradiates to the substrate vertically, it is circular. As described in the above, the incident angle is different depending on the irradiating position of the laser beam, and the shapes of the beam spot on the substrate differ.

Figure 17:
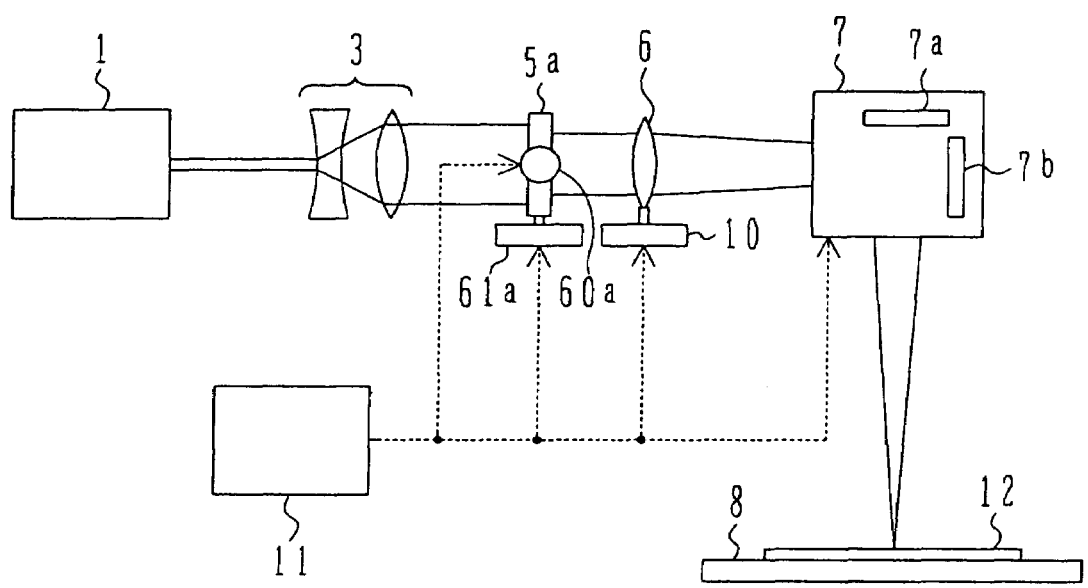
FIG. 17 is a schematic view of the laser processing apparatus according to the fourth embodiment of the present invention.

With reference to FIG. 17, the laser processing apparatus according to the fourth embodiment that can correct the shape of the beam spot corresponding to the irradiating position will be explained.

In the laser processing apparatus shown in FIG. 17, an aperture inclining mechanism 60a that rotates the aperture 5a around the axis that is vertical to the optical axis of the laser beam and an aperture rotation mechanism 61a that rotates the aperture 5a around the axis that is parallel to the optical axis of the laser beam are added to the laser processing apparatus shown in FIG. 12A. Moreover, components (paraxial components) in the peripheral of paraxial of the optical system is called an optical axis of the laser beam.

Moreover, the aperture rotation mechanism 61a is the same mechanism as that a mask rotation mechanism rotates the mask, and the aperture rotation mechanism rotates the aperture 5a around the axis parallel to the optical axis of the laser beam. The laser processing apparatus explained later with reference to FIG. 22A has the mask rotation mechanism.

The aperture inclining mechanism 60a and the aperture inclining mechanism 61a synchronizes with the movement of the galvano scanner 7 based on the control signal transmitted from the controller 11 and change the inclining angle surrounding the axis that is vertical to the optical axis of the laser beam and the rotation angle surrounding the axis that is parallel to the optical axis of the laser beam.

The shape of the beam cross section that is vertical to the optical axis and the shape of the beam cross section on the surface of the substrate at a time that the laser beam obliquely irradiates to the surface of the substrate are compared. The shape of the beam cross section on the surface of the substrate is a shape that the shape of the beam cross section that is vertical to the optical axis is expanded to the cross lines between the surface of the substrate and the irradiating surface. For example, when the laser beam with a circular cross section irradiates obliquely to the surface of the substrate, the beam cross section on the surface of the substrate becomes a ellipse that is long to the cross lines.

Therefore, by irradiating the laser beam formed to be oval of which a cross section cut in a vertical direction of the optical axis at a proper ratio of a minor axis and a major axis onto the surface of the substrate with an inclination by making the major axis vertical to the irradiating surface, the beam spot on the surface of the substrate will be circle.

Figure 18A:
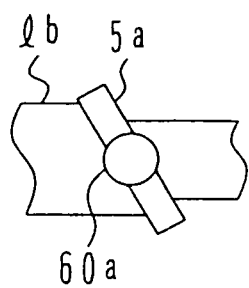
FIG. 18A is schematic view looked at from a direction of the axis of rotation of an aperture inclining mechanism that is rotated by the aperture inclining mechanism.

FIG. 18A schematically shows a diagram of the aperture 5a rotated around the axis that is vertical to the optical axis of the laser beam by the aperture inclining mechanism 60a looked along a direction of the rotation axis of the aperture inclining mechanism 60a. The laser beam 1b irradiated from left in the diagram is reformed or shaped its cross section by the aperture 5a to radiate to right in the drawing.

Figure 18B:
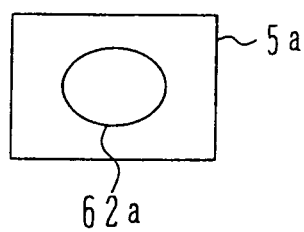
FIG. 18B is a schematic view looked at from a direction of an optical axis of the laser beam of the aperture rotated by the aperture inclining mechanism.

As shown in FIG. 18B, the circular pierced hole 62a of the aperture 5a rotated by the aperture inclining mechanism 60a looks ellipse when it is looked along the optical axis of the laser beam. That is, the cross section of the laser beam is reformed to ellipse.

Further, when a surface where the two different diameters of the circle-shaped pierced hole of the aperture 5a are placed crosses with the optical axis of the laser beam at a right angle, a cross section of the laser beam will be formed to a circle-shape. As inclining the aperture 5a and enlarging the angle between the central axis of the rotation of the circle-shaped pierced hole and the optical; axis of the laser beam, a minor axis of an oval of the cross section of the beam after the reformation. The aperture inclining mechanism 60a can change a ratio of length and width of the cross section of the laser beam.

Figure 18C:
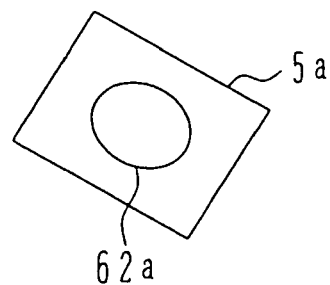
FIG. 18C is a schematic view showing the aperture rotating around the axis that is parallel to the optical axis of the laser beam by using the aperture rotation mechanism.

As shown in FIG. 18C, the aperture 5a is rotated around the axis that is parallel to the optical axis of the laser beam by using the aperture rotation mechanism 61a.

The shape of the beam cross section at a position where the beam spot of the laser beam becomes minimum (it is called a focus of the laser beam) is ellipse. The long axis direction of the beam cross section at the focus point is corresponding to the short axis direction of the beam cross section at a pierced hole position of the aperture 5a.

Therefore, the aperture 5a is rotated by the aperture rotation mechanism 61a so that the long axis direction which the beam cross section is ellipse at the pierced hole position matches with the cross line direction. By doing that, the shape of the beam spot on the substrate can be kept to be circle at any irradiating position.

Moreover, although the process by the light concentrating method in which it is unnecessary to focus the pierced hole of the aperture on the surface of the substrate has been explained, the shape of the beam spot on the substrate can be corrected in a case that a process by a mask projecting method wherein the image of the pierced hole is focused on the surface of the substrate can be executed. In the case of the mask projecting method, the long axis direction of the image of the pierced hole formed on the surface of the substrate is corresponding to the long axis direction of the beam cross section at the pierced hole position of the mask.

It is the same as that the mask having the circular pierced hole is inclined around the axis that is vertical to the optical axis of the laser beam. When the mask is rotated around the axis that is parallel to the optical axis of the laser beam, it is rotated so that the short axis direction of the ellipse of the beam cross line at a time of radiating the pierced hole matches with the cross line direction between the irradiating surface and the surface of the substrate.

Although the case that the shape of the pierced hole is a circle has been explained, the shape of the beam spot of the laser beam reformed by the pierced hole in any other shapes can be corrected.

Figure 19:
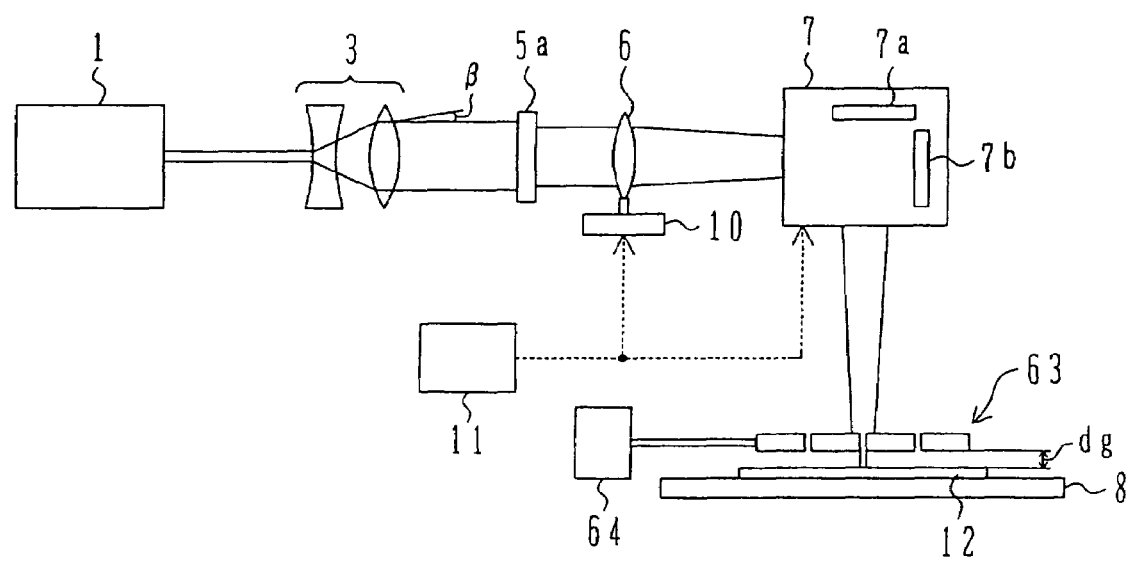
FIG. 19 is a schematic view of the laser processing apparatus according to the fifth embodiment of the present invention.

Next, a laser processing apparatus according to the fifth embodiment of the present invention that executes the laser processing method using the proximity mask will be explained with reference to FIG. 19. In the laser processing apparatus shown in FIG. 19, a proximity mask 63 is added to the laser processing apparatus shown in FIG. 12A.

The proximity mask 63 is held by a proximity mask holding mechanism (a proximity mask holder) 64, and is configured to (or disposed at) a position right on the substrate 12 in parallel to the surface of the substrate 12. A pierced hole having the same shape as a desired shape to be processed on the surface of the substrate is formed on the proximity mask 63. The distance dg (a proximity gap) from the proximity mask 63 to the surface of the substrate 12 is adjusted by the proximity mask holding mechanism 64.

An expander 3 enlarges the beam radius of the laser beam radiated from the laser source 1 to radiate the laser beam of parallel light. The laser beam that is radiated from the expander 3 has a spread angle (or beam divergence angle) β. By the expander 3, for example, when the beam radius of the laser beam is expanded by 10 times, the spread angle falls by $\frac{1}{10}$. By the expander 3, the spread angle of the laser beam can be adjusted.

Scanning on the proximity mask 63 by the galvano scanner 7, the radiation of the laser beam is executed. The laser beam is passed through the pierced hole of the proximity mask 63 to irradiate to the substrate 12, and the substrate 12 is processed. In the part other than the pierced hole through which the laser beam did not pass, the substrate 12 is not processed. As described in the above, the shape of the pierced hole that is formed in the proximity mask 63 is transcribed or transferred to the surface of the substrate, and the surface of the substrate can be processed.

At this time, although the irradiating position of the laser beam is changed, the laser radiation can be executed moving the position of the object lens 6 corresponding to the irradiating position of the laser beam to the substrate so that the variation of pulse energy at the surface of the substrate is suppressed. Moreover, the laser source 1 may be a laser source that radiates the continuous-wave laser beam. In that case, a variation of the power density at the surface of the substrate is suppressed.

In order to execute a precise process, it is necessary that the shape of the pierced hole that is formed in the proximity mask 63 is accurately transcribed to the substrate. The precision of the transcript is depending on the spread angle of the laser beam irradiated to the proximity mask. It may be considered that the spread angle of the laser beam irradiated to the proximity mask is same as the spread angle β of the laser beam at a tome of passing the expander.

Figure 20:
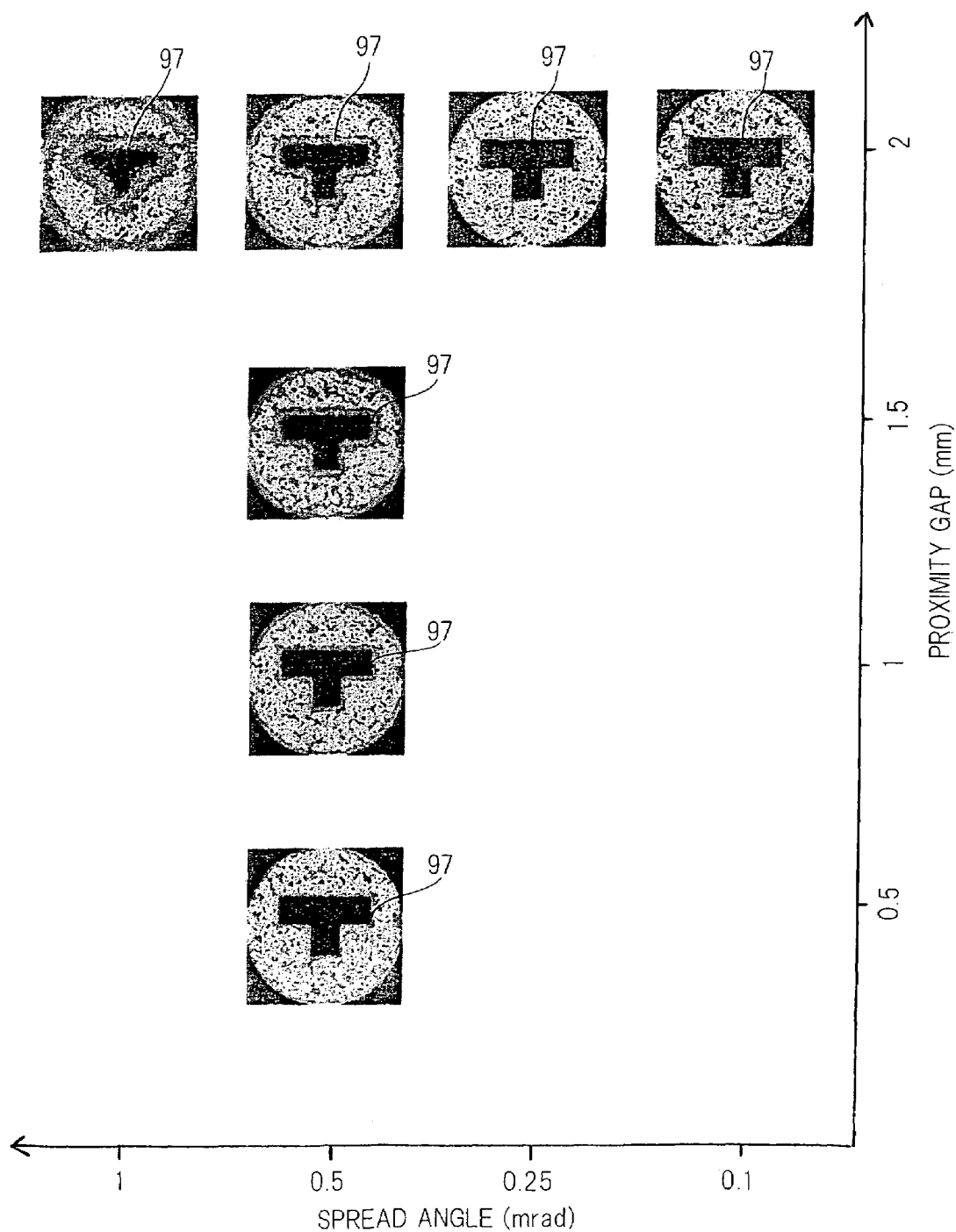
FIG. 20 is a plan view of the substrate, which an image of the pierced hole is projected, showing a result of a simulation concerning to transcription precision in a laser processing method using a proximity mask.

FIG. 20 shows a result of simulation how the precision of the transcript changes depending on proximity gap and the spread angle of the laser beam. A pierced hole image 97 with T-shape in a case that the proximity gap and the spread angle of the laser beam is variously changed. In each drawing, the spread angle of the laser beam is smaller as being positioned on the right side, and the proximity gap is smaller as being positioned on the lower side.

As an edge of the image 97 is clearer, the precision of the transcript will be higher. As obvious from the drawing, when the spread angles are the same, the precision of the transcript declines as the proximity gap becomes larger. Also, at a time of the same proximity gaps, the precision of the transcript declines as the spread angles becomes large. As making the proximity gap and the spread angle be smaller, the precision of the transcript can be higher.

Figure 21:
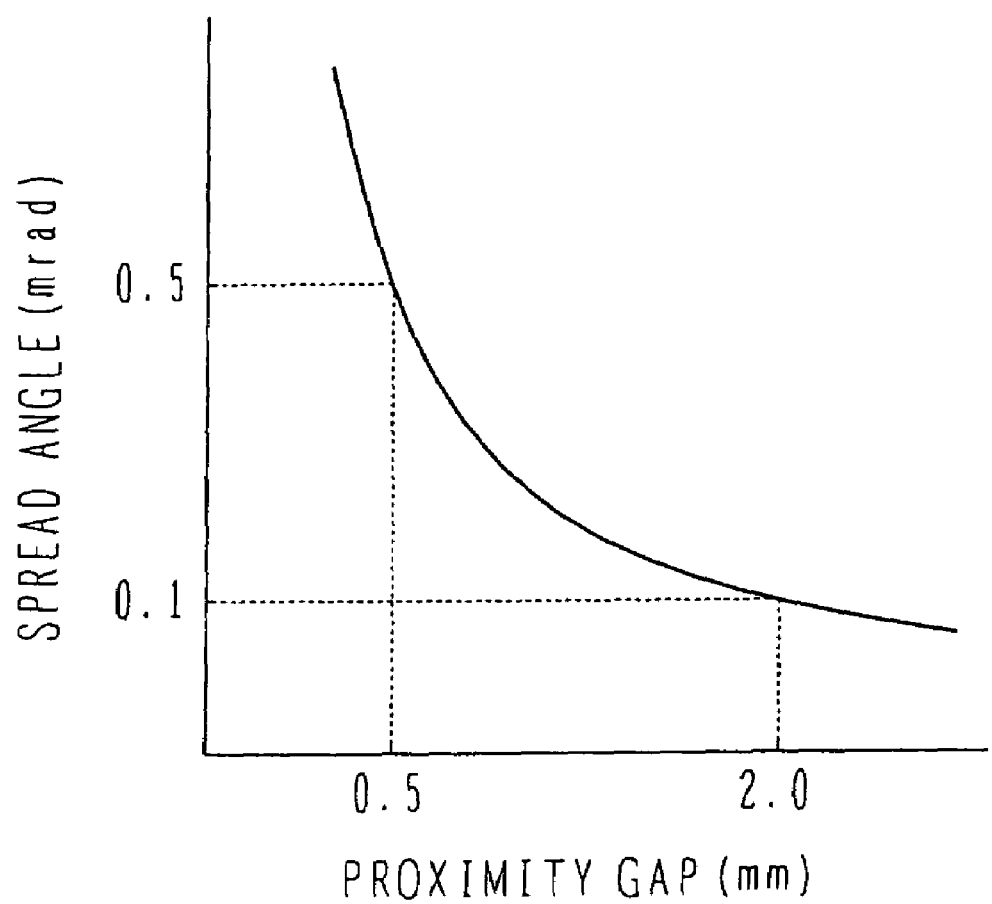
FIG. 21 is a graph that schematically shows a relationship between an extent angle of the laser beam and a proximity gap when the process is executed at a certain transcription precision.

FIG. 21 schematically shows a graph showing a relationship that the proximity gap and the spread angle of the laser beam should satisfy when a certain precision of the transcript is secured. When a certain precision of the transcript is secured, the spread angle should be small when the proximity gap is large, and the proximity gap should be small when the spread angle is large.

If the relationships between the proximity gap and the spread angle of the laser beam should satisfy for the various transcript precisionsare obtained in advance as shown in FIG.

21, the proximity gap and the spread angle can easily selected when the process is executed at the desired transcript precision.

In the laser processing method using the proximity mask, there is an advantage that the process can be executed at high transcript precision by setting the proximity gap and the spread angle small. Also, by executing the process by positioning the pierced hole of the proximity mask right on the position of the substrate to be processed, high positioning precision can be obtained. Since the surface of the substrate other than the position to be processed is covered by the proximity mask, there is an advantage that scattered material generated by scraping the substrate at the time of the process is hard to stick on the surface of the substrate.

Moreover, when the process for irradiating the laser beam that passed through the pierced hole of the proximity mask to the substrate is executed, the irradiating position to the substrate of the laser beam is moved by swinging the moving direction of the laser beam by the galvano scanner. Therefore, high-speeding of the process can be realized than the case of moving the irradiating position by moving the XY stage that loads on the substrate.

Next, with reference to FIG. 22A, the laser processing apparatus according to the sixth embodiment of the present invention that has the laser source that oscillates the continuous-wave laser beam will be explained. As a laser source 1 that oscillates the continuous-wave laser beam, for example, a semiconductor laser that oscillates the laser beam having a wavelength in an infrared light region can be used.

Laser beam 1b0 irradiated from the laser source 1 is irradiated to a dividing optical system 65. The dividing optical system 65 divides the laser beam 1b0 to laser beam 1b1 moving along a certain optical axis during a certain time and to laser beam 1b2 moving along other optical axis during other time.

The dividing optical system 65 is, for example, consisted of a half wave plate 65a, an electronic optical element 65b that indicates Pockels effect, and a polarizing plate 65c. The polarizing plate 65c polarizes the laser beam 1b0 radiated from the laser source 1 to make it linearly polarized light such as p-polarized light to the polarizing plate 65c. The p-polarized light is irradiated to the electronic optical element 65b.

The electronic optical element 65b revolves the polarization surface of the laser beam based on a trigger signal sig transmitted from the controller 11. When the electronic optical element 65b is in a condition that no voltage is imposed, the irradiated P-polarized light is radiated without a change. The electronic optical element 65b is in a condition that voltage is imposed, the electronic optical element 65b revolves the polarization surface of the P-polarized light at 90 degree. By that, the laser beam radiated from the electronic optical element 65b becomes s-polarized light to the polarizing plate 65c.

The polarizing plate 65c has the P-polarized light pass through without a change and reflects the S-polarized light. The laser beam 1b1 of the S-polarized light that is reflected by the polarization plate 65c irradiates to a beam dumper 66 that will be a terminator of the laser beam 1b1. The laser beam 1b2 of the P-polarized light that penetrates the polarization plate 65c irradiated to the expander 3.

The beam radius is enlarged by the expander 3, and the laser beam 1b2 made to be a parallel light irradiates to the mask 5 having a rectangular pierced hole. Here, an example of a process by the mask projection method will be explained. That is, the image of the pierced hole of the mask 5 is focused on the surface of the substrate 12 to execute the process.

The mask rotation mechanism 61 is used for rotating around the parallel axis to the optical axis of the laser beam. The mask rotation mechanism 61 is consisted of, for example, a goniometer, and rotates the mask only by a desired angle at a desired timing based on the control signal transmitted from the controller 11. Details of the mask rotation mechanism 61 will be explained later. The voice coil mechanism 9 moves the position of the mask 5 in parallel to the moving direction of the laser beam.

The laser beam 1b2 radiated from the mask 5 is concentrated by the object lens 6. The voice coil mechanism 10 moves the position of the object lens 6 in parallel to the moving direction of the laser beam. The laser beam radiated from the object lens 6 irradiates to the surface of the substrate 12 after passing the galvano scanner.

Figure 22A:
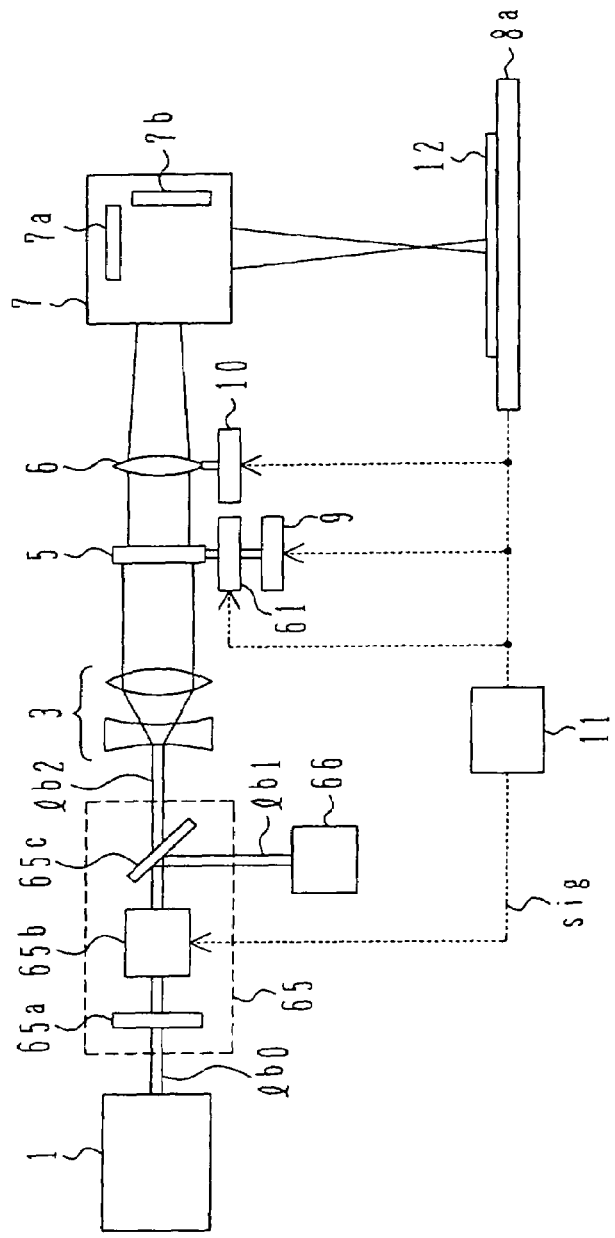
FIG. 22A is a schematic view of the laser processing apparatus according to the sixth embodiment of the present invention.
Figure 22B:
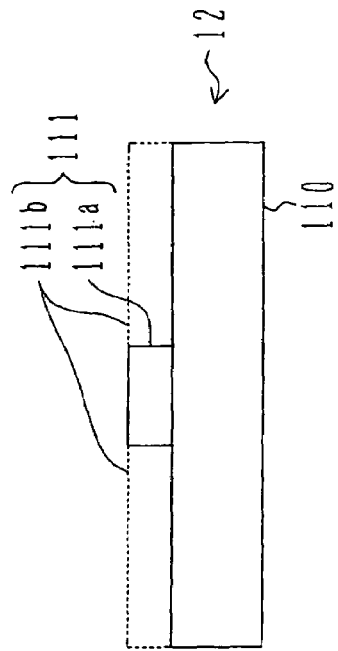
FIG. 22B is a schematic cross sectional view of the substrate.

With reference to FIG. 22B, the substrate 12 that is a processing target will be explained. A transcript layer 11 is positioned on the surface of a base layer 110. This transcript layer 111 has a property to be adhered to the surface of the base layer 110 when it is heated.

For example, a part 111a of the transcript layer 111 is heated by the irradiation and the heating makes the part 111a adhered to the base layer 110. When a part 111b where a part is not heated on the transcript layer 111 is removed, the only heated part 11a remains on the surface of the base layer 110. This is, for example, the similar to that only a heated part of ink on an ink ribbon is transcribed to a sheet of a paper when thermal transfer printing is executed.

Back to FIG. 22A, the explanation will be continued. An XY stage 8a is used as a holding stand of the substrate 12. The XY stage 8a can move the substrate 12 on a two-dimensional surface that is parallel to the surface of the substrate 12. The XY stage 8a is controlled by the controller 11, and the substrate 12 is moved to a desired position at a desired timing.

In an example of the laser processing method explained here, the scanner 7a for X and the scanner for Y of the galvano scanner is fixed to a position where the laser beam radiated from the galvano scanner 7 vertically irradiates to the substrate 12. By moving the substrate 12 at the XY stage 8a, the irradiation position of the laser beam to the substrate 12 will be moved.

By using the voice coil mechanisms 9 and 10, the length of the light path from the mask 5 to the object lens 6 and the length of the light path from the object lens 6 to the substrate 12 are set so that the image of the pierced hole of the mask 5 is focused on the surface of the substrate 12 at a desired focus magnification (a reduction rate).

With reference to FIG. 23, a control method of the dividing optical system will be explained. FIG. 23 shows an example of a timing chart of the trigger signal sig and the laser beam 1b0, 1b1 and 1b2. The radiation of the laser beam 1b0 is started at a time 0.

During the time 0 to the time 1, the trigger signal is not transmitted from the controller. Voltage is not imposed on the electro-optical element during that time, and the laser beam 1b2 is continuously radiated from the dividing optical system. The laser beam 1b1 is not radiated. The laser beam during that time is the continuous-wave.

During the time t1 to the time t2, the controller synchronizes with the trigger signal sig periodically transmitted from the controller, and voltage is imposed on the electro-optical element of the dividing optical system.

The electro-optical element is in a condition that voltage is imposed during the trigger signal sig is being transmitted, and the laser beam 1b0 is divided into the laser beam 1b1. On the other hand, the electro-optical element is in a condition that no voltage is imposed during the trigger signal sig is not being transmitted, the laser beam 1b0 is divided into the laser beam 1b2. The laser beam 1b2 from the time t1 to the time t2 becomes the laser beam which oscillation and pause are periodically repeated.

In the laser beam intermittently radiated during that time, by adjusting the trigger signal sig, pulse width w1 and period w2 can be set to an arbitral length. For example, the pulse width w1 is 10 μs to a few 10 μs, and the period w2 is 100 μs.

As described in the above, when the trigger signal is not input to the dividing optical system, the laser beam 1b2 that continuously radiates can be obtained. When the trigger signal is intermittently input to the dividing optical system, the laser beam 1b2 that intermittently radiates can be obtained.

Since the laser beam 1b2 continuously radiated can be continuously irradiated to the substrate, for example, it is suitable for the process for forming a line (a process leaving the transcript layer in a line shape on the base layer). On the other hand, since the laser beam 1b2 intermittently radiated can be irradiated intermittently to the substrate, for example, it is suitable for the process for forming a dot (a process leaving the transcript layer on the base layer in a dot shape).

Figure 24A:
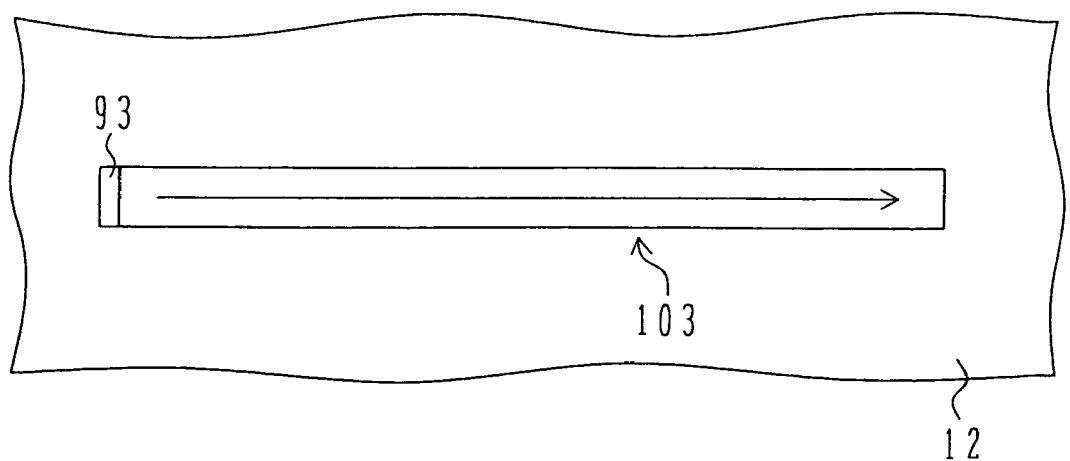
FIG. 24A is a schematic plan view of the substrate on which a line is formed.

With reference to FIG. 24A, a line processing method will be explained. The laser irradiation to the substrate 12 is started, and the process is started. At the beginning of the process, a full region at the edge of the line 103 is irradiated by the rectangular beam spot 93. Then, continuously irradiating the laser, the XY stage is moved to one direction so that the beam spot approaches other edge of the line 103. The moving direction of the XY stage is parallel to one side of the rectangular beam spot 93. Moreover, the moving direction of the beam spot on the substrate is indicated with an arrow.

When the beam spot reaches other edge of the line 103, the laser irradiation to the substrate is stopped, and the process will be finished. By doing that, by heating the region in lines on the surface of the substrate with the laser irradiation, the line 103 that is a linear-shaped remaining part of the transcript layer on the surface of the base layer will be formed.

A side of the long direction of the formed line 103 is parallel to one side of the beam spot 93, and an external shape of the line 103 is a rectangle of which the sides of width direction are parallel to the side crossing with one side of the beam spot 93. The width of the line 103 is the same as the length of the side crossing with one side of the beam spot 93.

Figure 24B:
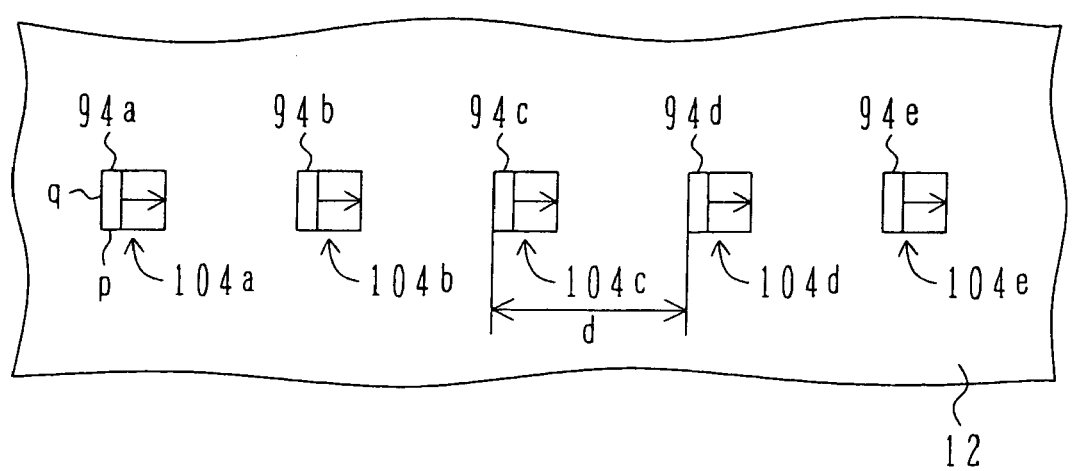
FIG. 24B is a schematic plan view of the substrate on which a dot is formed.

With reference to FIG. 24B, a method of the dot process will be explained. In the dot process, irradiating the laser beam intermittently on the substrate 12, the XY stage is moved to one direction. The moving direction of the XY stage is parallel to one side (called a side p) of the rectangular beam spot 94a.

First, at the beginning of the first pulsed laser beam irradiation, a whole region at one edge of a dot 104a is irradiated by the rectangular beam spot 94a. Since the XY stage is moved, the beam spot moves on the substrate until the laser irradiation of the first pulse terminates. The moving direction of the beam spot in indicated with an arrow.

By doing that, dotted region of the surface of the substrate is heated, and the dot 104a remaining the transcript layer in dots on the surface of the base layer is formed.

Thereafter, each of dots 104b, 104c, 104d and 104e is respectively formed by each of the laser irradiation of the second pulse, third pulse, fourth pulse and fifth pulse. Moreover, the region on the surface of the substrate irradiated by each of the beam spot 94b, 94c, 94d and 94e at the beginning of the irradiation of the second pulse, third pulse, fourth pulse and the fifth pulse is agreed with the region where the region of the surface of the substrate irradiated by the beam spot 94a is moved in parallel to the moving direction of the XY stage. Each dot stands in a parallel straight line to the moving direction of the XY stage.

An external shape of each dot is a rectangle having a parallel side to the side (called a side q) crossing with the side p of the beam spot 94a.

The length of the side crossing with the moving direction of the XY stage of each dot is same as the length of the side q, for example, 20 μm when the length of the side q is 20 μm.

The length of the side parallel to the moving direction of the XY stage of each dot is depending on the length of the side p of the beam spot, the moving velocity of the XY stage and the irradiating time (pulse width) of the pulse.

For example, it is assumed that the length of the side p of the beam spot is 12 μm, that the moving velocity of the XY stage is 800 mm/s and that the pulse width is 10 μs. Since the moving distance (that is, the distance which the substrate moves) of the XY stage in the pulse width 10 μs is 8 μm, the length of the side parallel to the moving direction of the XY stage of the dots is 20 μm that is added the moving distance 8 μm on the length of the side p of the beam spot 12 μm.

A pitch d between adjusting dots agrees with the distance that the XY stage moves during one period of the pulse. For example, when the pulse period is 375 μs, and when the moving velocity of the XY stage is 800 mm/s, the pitch d is 300 μm.

The above explanation is summarized that the 20 μm dot can be formed at a pitch of 300 μm in a case that the size of the beam spot is set to be the length of the side p of 12 μm and the length of the side q of 20 μm, and that the laser beam is oscillated with the pulse 10 μs at the period 375 μs to move the XY stage at 800 mm/s.

There is a case that process of a plurality of the lines having different directions on the substrate is desired. Although when the lines with different directions are formed in a state the direction of the beam spot on the substrate is fixed, problems such as that the line width changes depending on the line direction arise.

Figure 29:
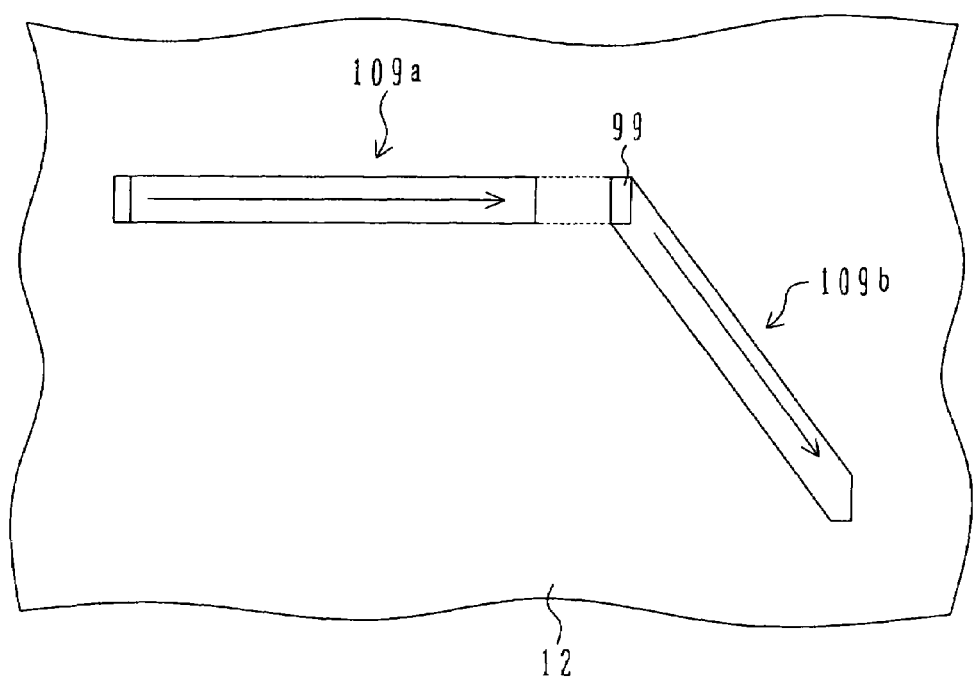
FIG. 29 is a schematic plan view of the substrate formed a line without the mask rotation mechanism.

With reference to FIG. 29, an example of the above situation will be explained. By the method explained with reference to FIG. 24A, the line 109a is formed first. Next, the line 109b having a different direction from the line 109a is formed without changing the direction of the beam spot. At the beginning of the irradiation, the beam spot 99 is irradiated at one end of the line 109b. Moving the XY stage to the longitudinal direction of the line 109b, the beam spot is moved to other end of the line 109b to form the line 109b.

As shown in the diagram, although the width of the line 109a is same as the length of the long side of the beam spot 99, the width of the line 109b is not always same as the length of the long side. Moreover, the end side of the line 109b cannot be formed in order to right cross to the longitudinal direction of the line. By using the mask rotation mechanism 61 shown in FIG. 22A, such problem can be avoided.

Figure 25:
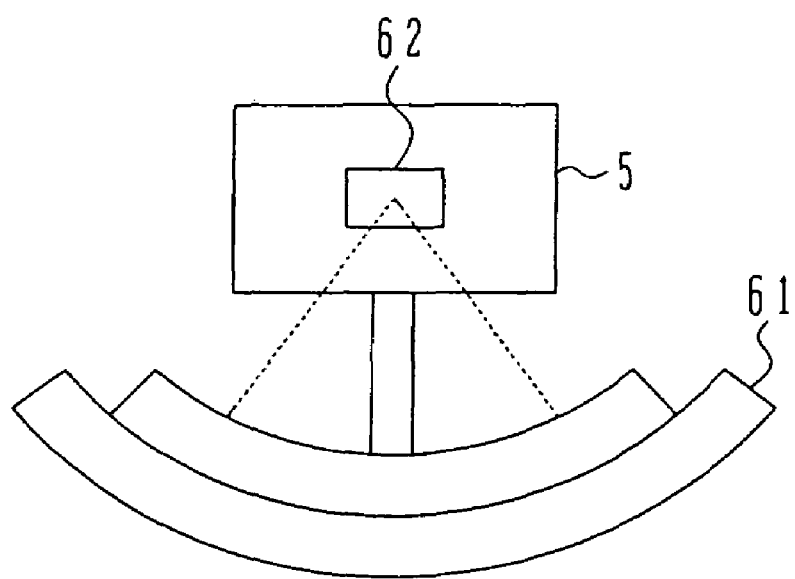
FIG. 25 is a schematic view showing a mask rotation mechanism holding a mask.

FIG. 25 is a schematic view showing the mask rotation mechanism 61 holding the mask 5 having the rectangle pierced hole 62. A surface where the two diagonal lines of the rectangle pierced hole 62 are drawn is vertical to the optical axis of the laser beam. The mask rotation mechanism 61 rotates the mask 5 around the axis parallel to the optical axis of the laser beam as the cross point of the rectangular diagonal of the pierced hole 62 to be the center of the rotation.

In correspondence to the rotation of the mask 5, the image of the pierced hole 62 is rotated on the surface of the substrate 12. The side of the rectangular image of the pierced hole 62 on the substrate can be parallel to the arbitrary direction on the surface of the substrate.

As explained next, the mask 5 can be rotated by the mask rotation mechanism 61 in order to change the direction of the line to be processed before changing the moving direction of the irradiating position of the laser beam on the substrate.

Figure 26:
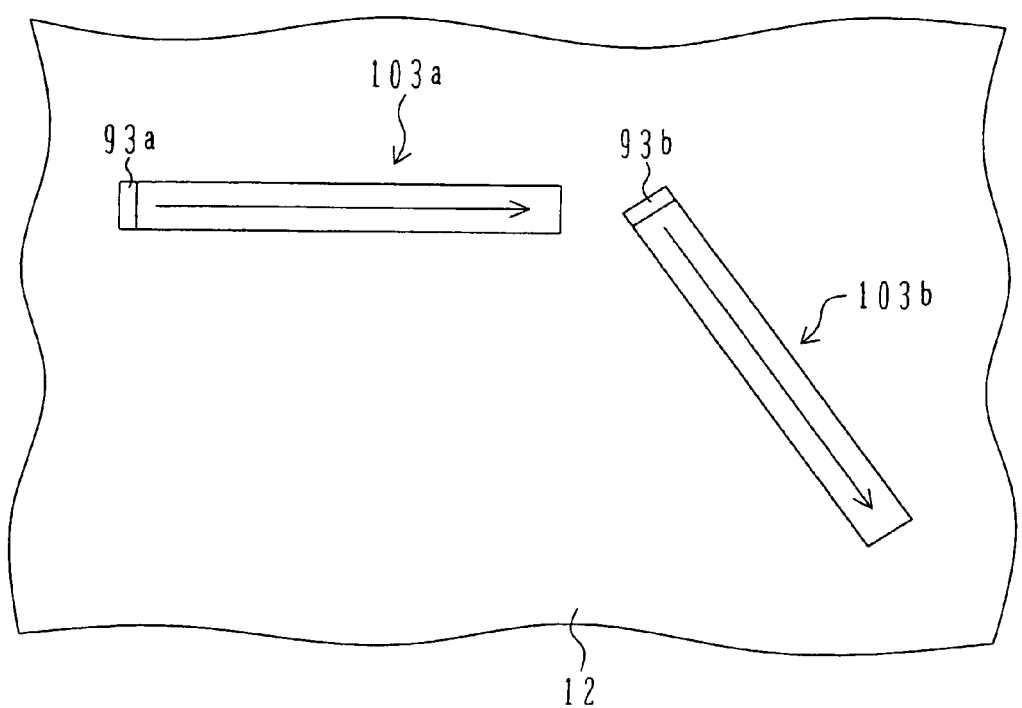
FIG. 26 is a schematic plan view of the substrate on which a line is formed by using the mask rotation mechanism.

With reference to FIG. 26, the method for processing a line using the mask rotation mechanism will be explained. By the method explained with reference to FIG. 24A, the line 103a is formed. It is assumed that the length of the long side of the beam spot 931 is the same as the width of the line 103a, and the direction of the short side of the beam spot 93a is parallel to the longitudinal direction of the line 103a.

Before starting the process of the line 103b having the different direction from the line 103a, the mask is rotated by the mask rotation mechanism so that the short side of the beam spot 93b becomes parallel to the longitudinal direction of the line 103b. Then, the substrate is moved by the XY stage so that the beam spot is irradiated on the whole end of the line 103b.

The irradiation of the laser beam is started, and by the same process as the process explained with reference to FIG. 24, the line 103b is formed moving the XY stage to the longitudinal direction of the line 103b. Also, the width of the line 103b is same as the length of the long side of the beam spot 93b.

By doing that, the plurality of the lines having different directions can be formed so that each of lines has the same width. Moreover, in order to form the plurality of dots having different direction without changing the size and the shape, the mask rotation mechanism can be used.

Although the example for making the laser beam a pulse by controlling the dividing optical system by the periodical trigger signal has been explained, it is not necessary that the trigger signal is periodical. For example, when the dots are formed at the different pitches, the trigger signal that is not periodic can be used. Moreover, the pulse width of the laser beam may not be fixed. It may be properly set corresponding to the size of the dots to be formed.

By changing the shape and the size of the beam spot on the substrate, the line width and the dot size can be adjusted. By the change of the mask, the shape and the size of the beam spot can be changed. Also, by changing the focus magnification (reduction rate), the size of the beam spot can be changed.

Although the example of the process leaving the transcript layer in lines or in dots on the substrate has been explained, it may be a process that the surface of the substrate is dug in lines or in dots by the laser irradiation.

The shape of the pierced hole of the mask is not limited to a rectangle, and it is selected corresponding to the shape of the dots and lines desired to be formed.

Although the example moving the irradiation position of the laser beam on the substrate by the XY stage has been explained, the irradiating position can be moved by changing or swinging or sweeping the moving direction of the laser beam with the galvano scanner.

Next, with reference to FIG. 27A, the laser processing apparatus according to the seventh embodiment of the present invention will be explained. In FIG. 27A, the laser processing apparatus has two laser sources, and one laser source radiates the pulsed laser beam, and another laser source radiates the continuous laser beam.

Laser source 1a is, for example, a Nd:YAG laser oscillator including a wave-length conversion unit, and radiates the pulsed laser beam of the fourth high-frequency wave (wave length of 266 nm) of the Nd:YAG laser. The pulse width is, for example, 10 ns. The pulsed laser beam that is radiated by the laser source 1a irradiates to the half-wave plate 69a to be a straight polarization in order to be the p-polarized light to the polarization plate 67.

The laser source 1b is, for example, a semiconductor laser oscillator, and radiates the continuous-wave laser beam of wavelength of 808 nm. The continuous-wave laser beam radiated from the laser source 1b irradiates to the half-wave plate 69b to be a straight polarization in order to be the s-polarized light to the polarization plate 67.

The pulsed laser beam radiated from the half-wave plate 69a passes through an expander 3a that enlarges the beam diameter and makes the beam parallel light and a mask 5 having a pierced hole in, for example, a rectangle shape. Thereafter, the pulsed laser beam is irradiated to the surface of the polarization plate 67 at 45 degree incident angle.

The continuous-wave laser beam radiated from the half-wave plate 69b passes through an expander 3b that enlarges the beam diameter and makes the beam parallel light and is reflected by a turning mirror 68. Thereafter, the continuous-wave laser beam is irradiated to the back surface of the polarization plate 67 at 45 degree incident angle.

The polarization plate 67 penetrates the pulsed laser beam that is the p-polarized light and reflects the continuous-wave laser beam that is the s-polarized light. The pulsed laser beam radiated from the laser source 1a and the continuous-wave laser beam radiated from the laser source 1b are combined by the polarization plate 67, and both laser beams move along with the same optical axis.

The pulsed laser beam passed through the polarization plate 67 and continuous-wave laser beam reflected by the polarization plate 67 are concentrated by the object lens 6, pass through the galvano scanner 7, and are irradiated to the substrate 12.

The XY stage 8a used as the holding stand of the substrate 12 can move the substrate 12 in a two dimensional surface that is parallel to the surface of the substrate 12. The XY stage 8a is controlled by the controller 11, and the substrate 12 is moved to a desired position at a desired timing. In the example of the laser processing method explained here, the scanner for X 7a and the scanner for Y 7b of the galvano scanner 7 are fixed at a position where the laser beam radiated from the galvano scanner 7 irradiates to the substrate 12 in vertical. By moving the substrate 12 at the XY stage 8a, the irradiation position of the laser beam to the substrate 12 is moved.

The voice coil mechanisms 9 and 10 move each position of the mask 5 and the object lens 6 parallel to the moving direction of the pulsed laser beam radiated from the laser source 1a. The image of the pierced hole of the mask 5 is focused on the surface of the substrate 12 at a desired focus magnification (reduction rate) by adjusting the position of the mask 5 and the object lens 6.

With reference to FIG. 27B, the substrate 12 that is a processing target will be explained. A surface layer 121 is formed on the surface of a base layer 120. The base layer 120 is, for example, a color filter of a liquid-crystal display device, and is a resin layer consisted of a polyimide group resin and an acryl group resin with thickness of 1 μm. The surface layer 121 is, for example, ITO film with thickness of 0.5 μm.

When only the surface layer 121 is removed, by the laser irradiation, it is difficult that only the surface layer 121 is processed because it is easier to process the base layer 120 than the surface layer 121. For example, when the laser is irradiated on the substrate, the base layer is explosively scattered under The influence of the heat conducted to the base layer 120, and the surface layer may be blown off.

The inventors of the present invention found out that the process for only the surface layer 121 becomes easy by executing the laser irradiation after preheating of the substrate. In the laser processing apparatus shown in FIG. 27A, the substrate 12 is preheated by the continuous-wave laser beam radiated from the laser source 1b, and the process of the holes or the like is executed by the pulsed laser beam radiated from the laser source 1a.

Figure 28A:
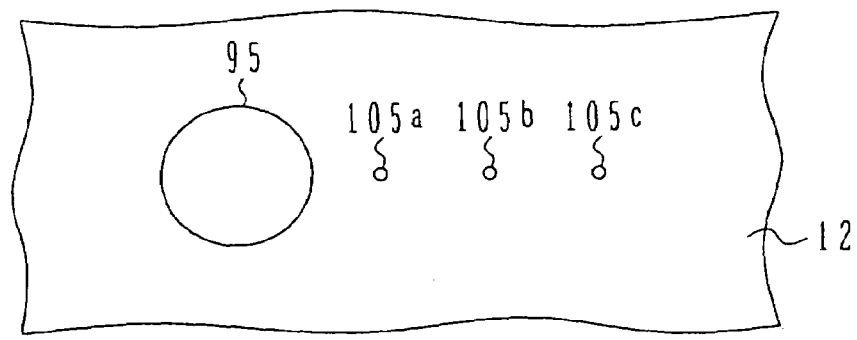
FIG. 28A, FIG. 28B and FIG. 28C are plan views of the substrate for explaining a positional relationship between a processing target point and a beam spot.
Figure 28B:
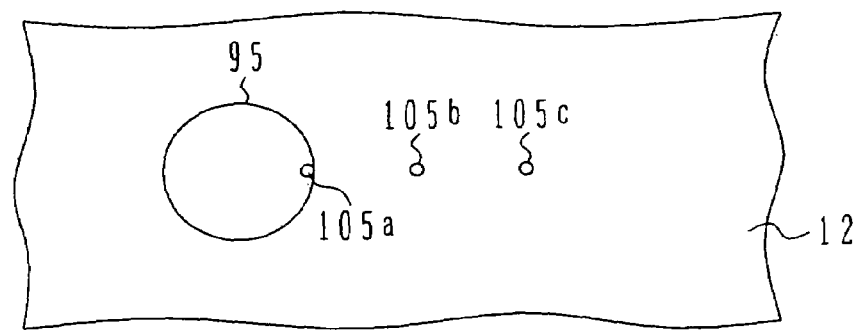
Figure 28C:
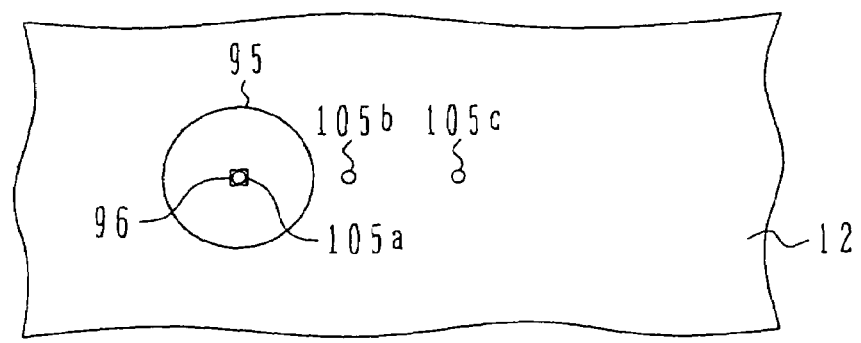

Next, with reference to FIGS. 28A to 28C, an example of a method for forming a hole irradiating the pulsed laser after preheating a processing target point on the substrate by the continuous-wave laser.

As shown in FIG. 28A, on the surface of the substrate 12 to be irradiated the continuous-wave laser beam (as indicated with circular beam spot 95), points 105a, 105b and 105c to be processed are defined. The center of the beam spot 95 will be positioned on a straight line connecting the points 105a, 105b and 105c to be processed. The XY stage is moved parallel to this straight line, and the points 105a to 105c to be processed are moved to the direction of the beam spot 95.

As shown in FIG. 28B when the point 105a to be processed reaches at the edge of the beam spot 95, the continuous-wave laser is irradiated the point 105a to be processed, and the preheat supply is started.

As shown in FIG. 28C, when the processing target point 105a reaches the edge of the beam spot 95, one shot of the pulsed laser is irradiated to the center of the beam spot 95. The beam spot of the pulsed laser is indicated with beam spot 96.

The processing target point is preheated during moving from the edge to the center of the beam spot 95. By irradiating the pulsed laser on the preheated processing target point 105a, it is controlled that the base layer is processed, and a hole can be formed on the surface layer of the substrate.

The substrate 12 is continuously moved, as same as the processing target point 105a, holes are formed at the points 105b and 105c.

The irradiation condition of the continuous laser beam used for preheating is that, for example, the beam spot is a circular shape with a diameter of 20 mm, and the power density at the surface of the substrate is 0.1 w/cm². The irradiation condition of the pulsed laser beam used for processing is that, for example, the beam spot is a square of 10 μm, and the pulse energy density at the surface of the substrate is 0.1 to 0.4 J/cm².

Moreover, the time the processing target point is preheated is almost same as the time that the processing target point moves for the length of the radius of the beam spot of the continuous-wave laser. For example, when the beam spot radius is 10 mm, and when the moving velocity of the XY stage is 800 mm/s, the time will be about 0.13 seconds. By irradiating at the center of the beam spot of the continuous-wave laser beam, it becomes easy to execute the process arranging preheating time, although the moving direction of the XY stage is variously changed.

Since the preheating given on the surface of the substrate by the continuous-wave laser irradiation conducts to the base layer, the base layer is processed when there is much preheat. Therefore, it is necessary that the preheating is given in order to be at a temperature at which the base layer is not processed or less than that temperature. For example, it is necessary that the temperature of the base layer is or less than a fusing point of the materials of the base layer.

Although the ITO film is transparent to a visible light, for example, absorption coefficient to near-infrared radiation with wavelength of 808 nm is not "0". Therefore, the light of this wavelength can be used for preheating the ITO film. When the light with the wavelength (for example, wavelength of about 1064 nm) that the absorption coefficient of the ITO is larger, preheating efficiency is expected to be improved.

Although the example for irradiating the pulsed laser beam and the continuous-wave laser beam to the substrate by overlapping them on the same optical axis has been explained, both laser beams may not be on the same optical axis. By irradiating both laser beams to the substrate with the beam spot of the pulsed laser beam included inside of the beam spot of the continuous-wave laser beam, pre-heat can be supplied to the spot to be processed from that the spot to be processed reaches to the edge of the beam spot of the continuous-wave laser beam to the position of the beam spot of the pulsed laser beam.

In order to give preheat, it is necessary that the processing target point reaches the irradiating position of the pulsed laser beam after passing inside of the beam spot of the continuous laser beam. Therefore, it is necessary the irradiating position of the pulsed laser beam is where the processing target point does not agree with the position of the processing target point at a time of contacting with perimeter of the beam spot of the continuous laser beam.

Although the example of forming a hole has been explained, the plurality of holes may be continuously formed so that a groove may be formed.

Although the example of moving the irradiating position on the substrate by the XY stage has been explained, the irradiating position can be moved by swinging the moving direction of the laser beam by the galvano scanner.

The present invention has been described in connection with the preferred embodiments. The invention is not limited only to the above embodiments. It is apparent that various modifications, improvements, combinations, and the like can be made by those skilled in the art.

What are claimed are:

1. A laser processing method, comprising the steps of:
emitting pulsed laser beam from a first laser source and continuous-wave laser beam from a second laser source; and
preheating a target spot defined on a surface of a processing target having a base layer and a surface layer formed of a material that is harder to be processed by laser irradiation than the base layer, with the continuous-wave laser beam from the second laser source, and thereafter irradiating the pulsed laser beam from the first laser source to the target spot to form a hole in the surface layer of the processing target.

2. The laser processing method according to claim 1, wherein said preheating step comprises preheating the processing target while keeping a temperature of the base layer not higher than a melting point of the base layer by irradiating the continuous-wave laser beam from the second laser source.

3. The laser processing method according to claim 1, wherein said preheating step comprises moving one of the laser beams and the processing target relative to each other, and wherein a beam spot of the pulsed laser beam is included inside of a beam spot of the continuous-wave laser beam.

4. The laser processing method according to claim 3, wherein a shape of the beam spot of the continuous-wave laser beam on the surface of the processing target is a circle, and the beam spot of the pulsed laser beam is positioned at a center of the circle.

5. A laser processing apparatus, comprising:
a holder configured to hold a processing target;
a first laser source configured to emit a pulsed laser beam;
a second laser source configured to emit a continuous-wave laser beam;

an optical system configured to transmit the pulsed laser beam from the first laser source and the continuous-wave laser beam from the second laser source on a surface of the processing target held by the holder in such a manner that a beam spot of the pulsed laser beam is included inside a beam spot of the continuous-wave laser beam; and a moving mechanism configured to move at least one of the beam spots and the processing target relative to each other, wherein the moving mechanism is configured to move the processing target relative to the beam spots while the second laser source is emitting the continuous wave laser beam.

6. The laser processing apparatus according to claim 5, wherein the optical system joins the pulsed laser beam from the first laser source and the continuous-wave laser beam from the second laser source, and transmits the laser beams on the surface of the processing target along same optical path.

* * * * *